3,084,159
3-ENOL ETHERS OF 3-OXO-Δ⁴-6-AMINOMETHYL STEROIDS AND PROCESS FOR PREPARING SAME
David Neville Kirk and Vladimir Petrow, London, England, assignors to The British Drug Houses Limited
No Drawing. Filed Jan. 25, 1962, Ser. No. 168,827
Claims priority, application Great Britain Feb. 22, 1961
26 Claims. (Cl. 260—239.55)

This invention is for improvements in or relating to organic compounds and has particular reference to steroidal materials containing a carbon substituent at $C_6$.

It is an object of the present invention to provide a new and general process for the preparation of the 3-enol ethers of 3-oxo-Δ⁴-6-aminomethyl steroids of the androstane, 19-norandrostane, pregnane and 19-norpregnane series.

We have made the surprising discovery that the 3-enol ethers of 3-oxo-Δ⁴-steroids of the androstane, 19-norandrostane, pregnane and 19-norpregnane series may be converted by the process of this invention into the corresponding 6-aminomethyl-derivatives or into addition salts thereof.

The process of this invention is a discovery of outstanding importance in the field of steroid technology. The 6-aminomethyl 3-enol ethers of the present invention represent a hitherto unknown group of steroidal raw materials which possess intrinsic utility as intermediates for the synthesis of other novel types of steroidal compounds. Thus, for example, in our co-pending application S.N. 168,794 filed concurrently with the present application is described a new process in which the products of the present invention, and in particular the quaternary salts derived therefrom, are submitted to hydrogenolysis of the C–N link, for example by treatment with Raney nickel in methanol, when the corresponding enol ethers of 6-methyl-3-oxo-Δ⁴-steroids are obtained in very high yield. The enol ethers of 6-methyl-3-oxo-Δ⁴-steroids, as described in our co-pending application filed concurrently with the present application, have biological properties in their own right. Thus, for example, the 3-enol ethers of 6-methylcortisone acetate are potent orally-active anti-inflammatory agents. In addition, the foregoing enol ethers of 6-methyl-3-oxo-Δ⁴-steroids may be readily hydrolysed by ethanolic hydrochloric acid to the commercially valuable 6α-methyl-3-oxo-Δ⁴-steroids. The compounds of the present invention also undergo hydrogenation, oxidation and hydrolysis, giving new types of materials hitherto unknown in the art, certain of which possess useful biological properties. In addition, some of the compounds of the present invention possess valuable biological properties which render them of value in, for example, the veterinary field. Thus they may possess hormonal or anti-hormonal properties. In addition, by virtue of the basic centres at $C_6$ present in the products of the present invention, they may possess pharmacodynamic properties rendering them able, for example, to affect the central nervous system and to affect the blood pressure.

An additional and striking advantage of the compounds of the present invention over the products of prior art is their ability to form water soluble salts, thereby rendering their administration, for example as elixirs, a matter of great simplicity. It is, consequently an additional object of the present invention to provide soluble salts of the 6-aminomethyl 3-enol ethers with pharmaceutically acceptable acids.

It is a further object of the present invention to provide pharmaceutical preparations of the biologically active materials.

The present invention provides new 3-enol ethers of 3-oxo-Δ⁴-6-aminomethyl steroids of the androstane, 19-norandrostane, pregnane or 19-norpregnane series including the Formula I below and their additional compounds with acids and boranes.

The invention provides the specific 6-aminomethyl 3-enol ethers:

17α,20:20,21 - bismethylenedioxy - 6 - dimethylaminomethyl-3-ethoxypregna-3,5-dien-11-one which is an intermediate for the preparation of 6-Me cortisone;

17α - acetoxy - 6 - dimethylaminomethyl - 3 - methoxy-16 - methylenepregna - 3,5-dien-20-one, 6-dimethylaminomethyl - 3 - ethoxy - 16α,17α-isopropylidenedioxypregna-3,5-dien-20-one borane, 6-dimethylaminomethyl-3-ethoxy-16α,17α - isopropylidenedioxy - pregna - 3,5-dien-20-one which are of value on account of their progestational properties;

17β - acetoxy - 3-ethoxy-6-(N-methyl-N-phenylaminomethyl)-androsta-3,5-diene and 6-dimethylaminomethyl-3-ethoxy-17β-hydroxyandrosta-3,5-diene borane which are of value on account of their anabolic and androgenic properties;

6 - dimethylaminomethyl - 3-methoxy-17α-methyl-17β-propionoxyandrosta-3,5-diene borane which is an intermediate for the preparation of 6α,17α-dimethyltestosterone, known to be an active anabolic/androgen in prior art;

17β - acetoxy - 3-ethoxy-6-dimethylaminomethylandrosta-3,5-diene, 17β-acetoxy - 3 - ethoxy-6-dimethylaminomethylandrosta-3,5-diene borane, 3-ethoxy-6-dimethylaminomethyl - 17β - propionoxyandrosta-3,5-diene borane and 17β - acetoxy - 3-methoxy-6-dimethylaminomethylandrosta-3,5-diene borane which are of value on account of their anabolic and androgenic properties;

17α - acetoxy - 3-ethoxy-6-dimethylaminomethylpregna-3,5 - dien - 20-one and 17α-acetoxy-3-ethoxy-6-dimethylaminomethylpregna-3,5-dien-20-one citrate which are of value on account of their progestational properties;

6-dimethylaminomethylcortisone acetate 3-enol ethyl ether and 6-dimethylaminomethyl cortisone acetate 3-enol ethyl ether hydrochloride which are intermediates for 6-Me cortisone acetate and the 3-ethyl ether thereof which have anti-inflammatory activity;

6 - dimethylaminomethyl - 19-nor-3-ethoxyandrost-3,5-dien-17β-acetate borane which is of value on account of its anabolic and androgenic properties;

6 - dimethylaminomethyl - 3-ethoxy-pregna-3,5,17(20)-trien-21-ethyl-oate borane and 6-dimethylaminomethyl-3-ethoxy-21-acetoxypregna-3,5,17(20)-triene borane which are intermediates for the preparation of 6-methyl-3-oxo-Δ⁴,¹⁷⁽²⁰⁾ pregna adrenoic acid;

17β - acetoxy - 6 - dimethylaminomethyl - 17α-ethyl-3-methoxyandrosta-3,5-diene which is an intermediate for the preparation of 6-methyl derivatives;

3-benzyloxy - 6 - dimethylaminomethylandrosta - 3,5-dien-17-one and 3-ethoxy-6-dimethylaminomethylandrosta-3,5-dien-17-one which are intermediates for the preparation of 6-methyl androstenedione and the enol ether thereof, which are of great value for the preparation of dimethisterone and analogous 17α-chloroethynyl-17β-hydroxy derivatives using methods of prior art;

21 - acetoxy - 17α - hydroxy-3-(β-hydroxyethoxy)-6-dimethylaminomethylpregna - 3,5 - diene-11,20-dione, 21-acetoxy-3-cyclopentyloxy - 17α - hydroxy - 6 - dimethylaminomethylpregna-3,5-diene-11,20-dione, 21-acetoxy-3-cyclohexyloxy - 17α - hydroxy - 6 - dimethylaminomethylpregna - 3,5 - diene-11,20-dione, 21-acetoxy-3-benzyloxy-17α-hydroxy-6-dimethylaminomethylpregna - 3,5 - diene-11,20-dione, 21-acetoxy - 3 - (3'-phenylpropyloxy)-17α-hydroxy - 6 - dimethylaminomethylpregna-3,5-diene-11,20-dione, 21-acetoxy - 3 - n - propyloxy-17α-hydroxy-6-dimethylaminomethylpregna-3,5-diene - 11,20 - dione, 21-acetoxy - 3 - isopropyloxy-17α-hydroxy-6-dimethylaminomethylpregna-3,5-diene - 11,20 - dione, 21-acetoxy-3-n-butyloxy - 17α - hydroxy - 6 - dimethylaminomethylpregna-3,5-diene-11,20-dione, 21-acetoxy - 3 - sec.-butyloxy-17α-hydroxy-6-dimethylaminomethylpregna - 3,5 - diene - 11, 20-dione, 21-acetoxy - 3 - n - amyloxy-17α-hydroxy-6-dimethylaminomethylpregna - 3,5 - diene - 11,20 - dione, 21-acetoxy-3-n-hexyloxy - 17α - hydroxy - 6 - dimethylaminomethylpregna-3,5-diene-11,20-dione and 21-acetoxy-3-n-heptyloxy-17α-hydroxy - 6 - dimethylaminomethylpregna-3,5-diene-11,20-dione which are intermediates for the preparation of 6-methyl cortisone acetate and the enol ethers thereof which have anti-inflammatory activity;

21-acetoxy-17α-hydroxy - 3 - methoxy - 6 - dimethylaminomethylpregna-3,5,9(11)-trien-20-one which is an intermediate for the preparation of 6-methyl 9:11-ene corticoids;

17α-hydroxy - 3 - methoxy-21-methyl-6-dimethylaminomethylpregna-3,5-diene-11,20-dione which is an intermediate for the preparation of 6-methyl derivatives;

17α,20:20,21 - bismethylenedioxy - 6 - dimethylaminomethyl-3-ethoxypregna-3,5-dien-11β-ol which is an intermediate for the preparation of 6-methyl hydrocortisone;

17α-acetoxy - 6 - dimethylaminomethyl-3-methoxy-16-methylenepregna-3,5-dien-20-one which is of value on account of its progestational properties;

6-dimethylaminomethylcortisone acetate 3-enol methyl ether which is an intermediate for the preparation of 6-methyl cortisone;

16α,17α-epoxy - 6 - dimethylaminoethyl - 3 - methoxy-pregna-3,5-dien-20-one which is an intermediate for the preparation of medroxyprogesterone acetate;

21-acetoxy-6-dimethylaminomethyl - 3 - ethoxypregna-3,5-dien-20-one which is an intermediate for the preparation of 6-methyldesoxycorticosterone acetate;

17β-acetoxy - 6 - dimethylaminomethyl - 3 - ethoxy-2α-methylandrosta-3,5-diene which is an intermediate for the preparation of 2α,6α-dimethyltestosterone and has some anabolic/androgenic activity;

6-dimethylaminomethyl-3-methoxypregna - 3,5 - dien-17α,21-diol-11,20-dione diacetate which is an intermediate for the preparation of 6-methyl cortisone diacetate;

6-dimethylaminomethyl - 3 - methoxyandrosta-3,5-dien-17-one which is an intermediate for the preparation of 6-methyl androstenedione and the enol ether thereof, which are of great value for the preparation of dimethisterone and corresponding 17α-chloroethynyl-17β-hydroxy derivatives using methods of prior art;

6 - dimethylaminomethyl-3-methoxyoestra - 3,5 - dien-17-one, which is of value as an intermediate for the preparation of 6-methylated 19-nortestosterone derivatives, into which it may be converted by reduction to the 6-methyl derivative, followed by reaction at C₁₇ with Grignard reagents;

21-acetoxy - 6 - dimethylaminomethyl-3-methoxypregna-3,5,17(20)-trien-11-one which is an intermediate for the preparation of 6-methylcortisone into which it may be converted by reduction to the 6-methyl derivative and acid hydrolysis to the 3-oxo-6α-methyl-Δ⁴-derivative;

6-dimethylaminomethylcortisone 17α,21 - acetonide 3-enol methyl ether and 6-dimethylaminohydrocortisone 21-acetate 3-enol methyl ether which are of value for the preparation of 6-methylcortisone into which they may be converted by reduction to the 6-methyl enol ethers followed by acidic hydrolysis.

According to the present invention there is provided a process for the preparation of 3-enol ethers of 3-oxo-Δ⁴-6-aminomethyl steroids of the androstane, 19-norandrostane, pregnane and 19-norpregnane series including the formula

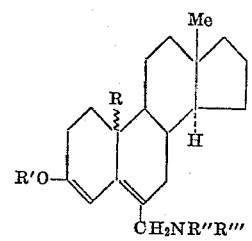

(where R is Me or H, R'=alkyl, hydroxyalkyl, cycloalkyl, aralkyl or a functional derivative thereof and R" is an alkyl group containing up to 6 carbon atoms, R'" is an alkyl group containing up to 6 carbon atoms or phenyl or together form a ring wherein —NR"R'" represents piperidino, pyrrolidino or morpholino), which process comprises treating a corresponding 3-substituted-3,5-diene steroid of the androstane, 19-norandrostane, pregnane or 19-norpregnane series including the formula

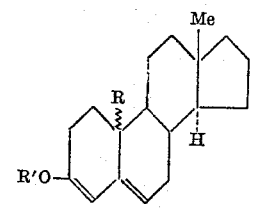

where R and R' have the same meaning as above with the Vilsmeier reagent under anhydrous conditions to give an iminium intermediate of the androstane, 19-norandrostane, pregnane or 19-norpregnane series assigned the general formula

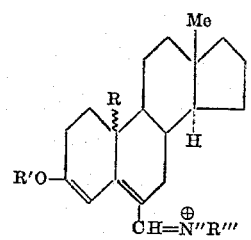

where R, R', R" and R'" have the same meaning as above and reducing the iminium intermediate to give the desired 6-aminomethyl 3-enol ether.

As hereinafter described the Vilsmeier reagent (see Houben-Weyl, Methoden der Organische Chemie, 4th ed., 1954, vol. 7 (1), page 29 et seq.) is preferably a complex formed from a formamide such as dimethylformamide and an acidic reagent such as phosphorus oxychloride or phosgene and is employed in an anhydrous non-hydroxylic organic solvent preferably ethylene dichloride. The reaction is conveniently carried out at 0° C. to 25° C. for from 1 to 2 hours.

Formula III has been assigned by Bosshard and Zollinger (Helv. Chem. Acta, 1959, 42, 1659) to the above iminium intermediate formed under Vilsmeier conditions following their work on the mechanism of the Vilsmeier reaction.

The reduction may be effected with the hydrides and organometallic hydrides of boron and aluminum. Preferably the boronhydrides of sodium, potassium, lithium, calcium or zinc may be employed. Other particularly convenient reducing agents include (di-) borane and mono- and dialkyl derivatives of borane and their complexes with bases such as pyridine. Other suitable reducing agents include substituted borohydrides including lithium cyanoborohydride, lithium and sodium alkoxyborohydrides. Aluminum analogues of the above borohydrides may also be employed, if desired.

As hereinafter described, employment of boron hydrides or borohydrides as reducing agents may result in production of borane complexes of the 6-aminomethyl 3-enol ethers of the present invention. These borane complexes often form a convenient means by which the bases may be isolated.

The invention also provides therefore a process for the preparation of borane complexes of the 6-aminomethyl 3-enol ethers of the androstane, 19-norandrostane, pregnane and 19-norpregnane series including the formula

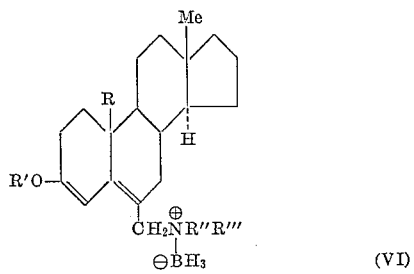

(VI)

(where R, R', R'' and R''' have the same meaning as above) which process comprises treating a 3-substituted-3,5-diene steroid of the androstane, 19-norandrostane, pregnane or 19-norpregnane series including the formula

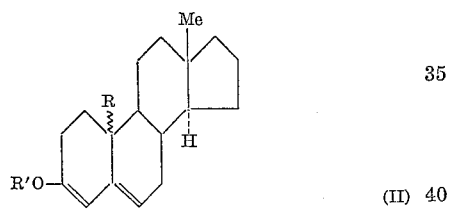

(II)

(where R and R' have the same meaning as above) with the Vilsmeier reagent under anhydrous conditions to give an iminium intermediate of the androstane, 19-norandrostane, pregnane or 19-norpregnane series including the general formula

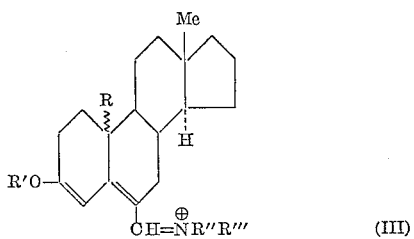

(III)

(where R, R', R'' and R''' have the same meaning as above) and reducing the iminium intermediate with a boron hydride or metallic borohydride in excess. The boron complexes are preferably prepared by slow addition of a solution of lithium borohydride in an inert organic anhydrous solvent such for example as tetrahydrofuran to the dark red solution of the Vilsmeier iminium intermediate in an inert organic anhydrous solvent (e.g. ethylene dichloride) conveniently at a temperature between 0° C. and 45° C. until the dark red colour of the solution has changed to pale yellow and then pouring the mixture into water and isolating the product (which may be a borane complex) with ether. The foregoing temperature limits are not critical but serve as a guide to convenient working conditions.

STARTING MATERIALS

Enolic ethers [e.g. (I) where R is Me and R' is alkyl, hydroxyalkyl, cycloalkyl or aralkyl as well as chemical equivalents thereof such as chloroalkyl or alkoxyalkyl] may be employed as starting materials for the invention. Methyl, ethyl and benzyl ethers [e.g. (I) in which R' is Me, Et or Bz] form the preferred group of starting materials and may be readily prepared from 3-oxo-$\Delta^4$-steroids by methods well established by prior art. Hydroxyalkyl enol ethers (in which, for example, R' is $HO.CH_2CH_2$) may also be employed and may be prepared in situ from the corresponding 3-ethylenedioxy-$\Delta^5$-steroids in the presence of the Vilsmeier reagent with which they subsequently react to yield the required ionic intermediates including the general Formula III. In addition, the required 3-enolic ethers of the 19-norandrostane and 19-norpregnane series including general Formula I, where R is H and R' is as hereinabove defined, may be prepared in situ from the corresponding 3-ethers of oestra-2,5(10)-dien-3-ol, which are converted in the presence of the Vilsmeier reagent into the required 3,5-dienes including general Formula I, where R is H and R' is as hereinabove defined, and subsequently react with it to yield the required ionic intermediate including general Formula III, where R is H and R' is as hereinabove defined. [The 3-ethers of oestra-2,5(10)-dien-3-ol, as is well known to those skilled in the art, are readily prepared in high yield by the Birch reduction of the appropriate 3-ethers of oestra-1,3,5(10)-trien-3-ol.]

VILSMEIER REAGENT

The Vilsmeier reagent is generally understood to be a reactant formed from a formylated secondary amine and an acid halide selected from the group comprising those acid halides which readily undergo nucleophilic displacement of a halide ion on treatment with the N-formyl derivative of a secondary amine [see, for example, Bosshard and Zollinger, Helv. Chim. Acta, 1959, 42, 1659].

Various formamides such as

Dimethylformamide
Diethylformamide
Methylphenylformamide
Ethylphenylformamide
Formylpiperidine
Formylmorpholine
Methylethylformamide may be employed. As mentioned above dimethylformamide is the preferred formamide.

In addition to phosphorus oxychloride and phosgene, other acidic reagents such as phosphorus oxybromide and pentachloride may be employed. Thionyl chloride, oxalyl chloride and similar acid halides may also be used. Phosgene is the preferred reagent.

It will be apparent to those skilled in the art that the grouping R'' and R''' included in Formulae II and III arise from the basic residue present in the Vilsmeier reagent, i.e. they represent the substituents attached to the nitrogen atom in the substituted formamides. When such formyl derivatives as formyl piperidine are used for preparing the Vilsmeier reagent the groups R'' and R''' will together form a pentamethylene chain.

SCOPE OF THE PROCESS

The process of the invention is applicable to the enolic derivatives of 3-oxo-$\Delta^4$-steroids. Thus, for example, it may be successfully applied to derivatives of androstane including androstane, 19-norandrostane, 9$\beta$,10$\alpha$-androstane and more complex derivatives thereof such as cholestane, spirostane, ergostane and stigmastane. Again the 6-formylation reaction may be applied to derivatives of pregnane including pregnane, 19-norpregnane and 9$\beta$,10$\alpha$-pregnane. Such systems may additionally contain further substituents as indicated below:

Hydroxyl groups: The Vilsmeier reagent is known by prior art to formylate or replace by halogen free hydroxyl groups (see Houben-Weyl, loc. cit.). It may be advantageous, therefore, to protect hydroxyl groups by acylation and subsequently regenerate them by hydrolysis or hydrogenolysis, if so desired. Thus, 6-substitution of testosterone 3-methyl enol ether may be effected using 2.5 mols of Vilsmeier reagent to give the 6-aminomethyl derivative of 3-methoxyandrosta-3,5-dien-17β-ol or its 17-formate depending upon subsequent treatment of the resulting product. Again, by treating the 3-enol ether of cortisone 21-acetate with ca. 1.6 molar proportions of the Vilsmeier reagent, the 6-dimethylaminomethyl derivative may be obtained.

Hydroxyl groups in rings A and B interfere with the Vilsmeier reaction. Hydroxyl groups and functional derivatives thereof in such positions as 11, 12, 16 (including 16-hydroxymethyl), 17, 18, 20 and 21 (including the condensation products of 16α,17α-glycols with carbonyl components), however, generally permit the desired substitution at $C_6$ to take place but may undergo formylation during the Vilsmeier reaction.

Carbonyl groups: Carbonyl groups such, for example, as carbonyl groups at 11, 12, 16, 17, 18 and 20.

Carbalkoxy groups: Carbalkoxy groups at $C_{13}$, $C_{16}$ and $C_{17}$, or in the side chain. Cyano-groups at $C_{13}$, $C_{16}$ and $C_{17}$ permit formation of the intermediate (III).

Alkyl groups: Alkyl groups other than at $C_4$ and $C_6$ and in particular methyl groups at $C_2$, $C_{11}$, $C_{16}$, $C_{17}$ and $C_{21}$ and ethyl at $C_{17}$.

Alkenyl groups: Vinyl and allyl groups at $C_{17}$ do not interfere with the formation of the intermediate (III).

Methylene and ethylidene groups: At positions 11, 16, 17 including 16:17-cyclomethylene.

Lactone, ether and spiroketal residues: Lactone and spirolactone residues such as —O.CO.CH$_2$.CH$_2$— attached to $C_{17}$, etheric groups at $C_{16}$, and bridging $C_{18}$ and $C_{20}$, spiroketal moieties such as are present in diosgenone.

Halogen groups: Chlorine, bromine or fluorine substituents in rings C and D or in the side chain.

Unsaturated linkages: Unsaturated linkages at $C_{9(11)}$, $C_{11}$, $C_{14}$, $C_{16}$ and $C_{17(20)}$.

Ketol groups: Ketol groups at $C_{11}$–$C_{12}$, $C_{16}$–$C_{17}$, $C_{17}$–$C_{20}$ and $C_{20}$–$C_{21}$ are preferably acylated prior to reaction with the Vilsmeier reagent.

Corticoid side chain: The corticoid side chain may be protected by acylation at $C_{17}$ and/or $C_{21}$, by reaction with formaldehyde to give the bismethylenedioxy derivative, by forming the $C_{17}$–$C_{21}$ cyclic carbonate or acetonide or by other methods known to those skilled in the art, and subsequently regenerated as desired.

Epoxides: It is known to those skilled in the art that epoxides may undergo reaction (a) with acidic reagents such as the halogen hydracids including hydrogen chloride and hydrogen bromide to give the corresponding 2-substituted 1-hydrins including halohydrins such as the chlorohydrins and bromohydrins and (b) with the Vilsmeier reagent to yield acylated (such as formylated), derivatives of the corresponding 2-substituted 1-hydrins which may be chlorohydrins or bromohydrins (see, for example, Ziegenbein and Franke, Chem. Ber., 1960, 93, 1681).

It will consequently be apparent to those skilled in the art that epoxide groups present in the 3-enolic ethers that constitute the starting materials of the present invention (a') may undergo reaction with the hydracid, and particularly with the hydrogen chloride (or hydrogen bromide) formed during the Vilsmeier condensation to yield the corresponding hydrins and particularly the corresponding chlorohydrins (or bromohydrins), (b') may react directly with the Vilsmeier reagent, particularly if the Vilsmeier reagent is present in excess, to yield the acylated hydrins and particularly the formylated chlorohydrins (or bromohydrins) or (c') may yield the (halo)hydrins as in (a') which may then undergo further reaction with the Vilsmeier reagent with replacement of the hydroxyl group by halogen (see Houben-Weyl, loc. cit.). In general reaction conditions can be so adjusted as to obtain a preponderance of the desired product. This, for example, by using ca. 1 mol. porportion of the Vilsmeier reagent, attack upon the 16α,17α-epoxide residue present in 16α,17α-epoxypregnan-20-one derivatives may be minimised. Any halohydrin or acylated halohydrin present in the mixture may be reconverted almost quantitatively into the epoxide by treatment with alkali. Alternatively, by using larger quantities of the Vilsmeier reagent, it is possible to obtain conversion of such an epoxide moiety into the halohydrin or a derivative thereof. With 16β-methyl-16α,17α-epoxypregnan-20-ones a different situation obtains. 16β-methyl-16α,17α-epoxypregnan-20-ones are known to be converted directly into 17α - hydroxy-16-methylenepregnan-20-ones (see Kirk, Petrow, Stansfield and Williamson, J. Chem. Soc., 1960, 2385), and not into the corresponding (halo)hydrins by acidic reagents. It will be apparent to those skilled in the art that such 16β-methyl-16α,17α-epoxypregnan-20-one derivatives may be converted directly in one operation into the corresponding 6-aminomethyl derivatives of 17α-hydroxy-16-methylenepregnan-20-one by using conveniently approximately 2-molar proportions of the Vilsmeier reagent.

REACTION OF THE 3-ENOLIC ETHERS OF 3-OXO-Δ⁴-STEROIDS WITH THE VILSMEIER REAGENT TO YIELD IMINIUM INTERMEDIATES

The preferred procedure is as follows:

Phosgene (not less than 1.05 mols), either directly or in solution in an anhydrous non-hydroxylic organic solvent which is preferably ethylenedichloride, methylenedichloride, tetrahydrofuran, dioxan or benzene is added at 0° C. to a solution of dimethylformamide (>1.05 mol.), preferably in one of the foregoing organic solvents, when formation of the Vilsmeier reagent occurs.

The steroidal 3-enol ether, either in solution, preferably in one of the foregoing organic solvents, or in the finely-powdered state, is added at 0° C. to the prepared Vilsmeier reagent. Moisture must be rigidly excluded during these operations. The mixture is stirred and the reaction allowed to proceed spontaneously, when darkening of the solution occurs and the temperature of the mixture rises. In general, in working with small batches of material, external cooling is not necessary, but such cooling may become desirable when the scale of the reaction is increased. Reaction is generally complete in 1 to 2 hours when ethylenedichloride or methylene chloride is used as solvent and somewhat slower in dioxan, tetrahydrofuran or benzene. The mixture will generally have a dark reddish-brown colour.

In general 1.05–1.6 molar proportions of the Vilsmeier reagent are preferred. When 16α,17α-epoxy groups or other groups that react with the Vilsmeier reagent such as free hydroxyl groups are present, however, it may be advantageous to employ a correspondingly increased molar proportion of the Vilsmeier reagent.

When the starting material contains one free hydroxyl group, as for example in the 3-enol ether of testosterone or cortisone 21-acetate, optimum yields are obtained by employing ca. 2 molar proportions of the Vilsmeier reagent, whilst for a starting material having two free hydroxyl groups, such for example as a 3-enol ether of hydrocortisone 21-acetate, it is advisable to use ca. 3 molar proportions of the Vilsmeier reagent.

REDUCTION OF THE 6-IMINIUM INTERMEDIATES TO 6-AMINOMETHYL DERIVATIVES OR COMPLEXES/SALTS THEREOF

Reduction of the 6-iminium intermediates of the androstane, 19-norandrostane, pregnane and 19-norpregnane series including Formula III, where R, R', R'' and R''' are as hereinabove defined, may be effected by systems furnishing hydride ions. Such systems include the hydrides of boron and aluminium and the complex hydrides and organometallic hydrides of boron and aluminium as hereinabove defined.

It will be apparent to those skilled in the art that the choice of reducing system will depend upon the chemical structure of the intermediate iminium derivative. Thus, for example, iminium intermediates such as (IV;

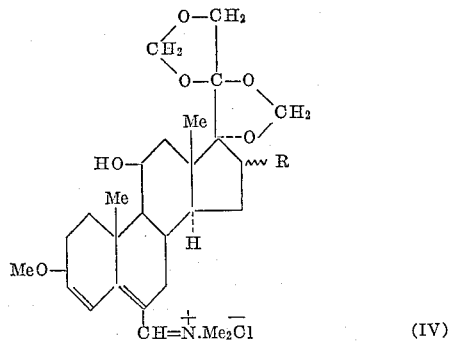

where R is H, α-Me or β-Me) which are derived from the bismethylenedioxy-3-enol ethers of hydrocortisone (and its 16α-Me and 16β-Me derivatives) may be readily reduced with lithium aluminium hydride, which may be used in excess of the theoretical requirements. Employment of lithium aluminium hydride for the reduction of iminium intermediates containing free oxo- [or other readily reducible] groups such, for example, as the iminium intermediates (V; where R is H, α-Me or β-Me) derived from cortisone 21-acetate 3-enol ether

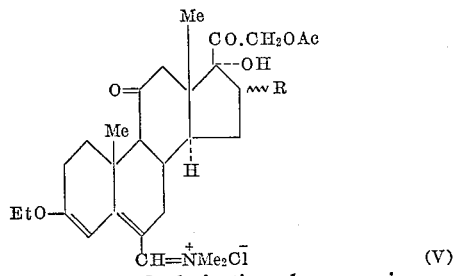

and its 16α-Me and 16β-Me derivatives, however, is generally accompanied by some reduction of the cortical side chain, even when the reducing agent is present in approximately theoretical amount. In such instances better yields of product may be obtained by use of the borane group of reducing agents such as the boron hydrides and the Na, K, Li, Ca and Zn borohydrides, which are preferably employed in amounts only just sufficient to reduce the iminium residues.

It is well-known to those skilled in the art that the boranes form stable complexes of salt-like character with amines by co-ordination with the free electron pair present in them [see, for example, "Boron Fluoride," by A. V. Topchiev, S. Y. Zavgorodnil and Ya. M. Paushkin, Pergamon Press, 1959, p. 98 et seq.].

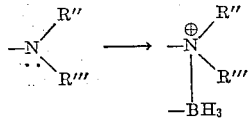

It consequently follows that employment of excess boron hydrides or metallic or organometallic borohydrides as reducing agents for the iminium intermediates may result in production of the borane complexes of the 6-aminomethyl 3-enol ethers of the androstane, 19-norandrostane, pregnane and 19-norpregnane series including the formula

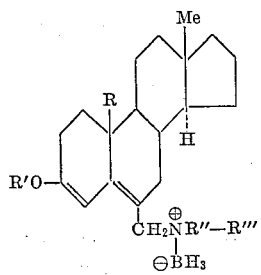

(where R, R', R" and R"' have the meaning hereinabove defined) which compounds are formed by reduction of the iminium intermediates to the corresponding amines followed by their salt-like combination with excess borane present in the reaction medium. As the resulting boranes are often sparingly soluble, crystalline and readily purified compounds it may be convenient to adjust the experimental conditions in such a way as to ensure conversion of the 6-aminomethyl products into the corresponding boranes. The borane complexes possess essentially the same biological activity as the parent bases and are virtually equivalent to them in many of the reactions undergone by the latter. The free bases may be regenerated from the borane complexes, if so desired, by methods established by prior art [see, for example, Topchiev et al., loc. cit.], for example by treatment with a strong base, e.g. piperidine.

Preparation of the borane complexes of the 6-aminomethyl derivatives may be accomplished in many cases by slow addition of a (filtered) solution of lithium borohydride in for example anhydrous tetrahydrofuran (with rigorous exclusion of moisture) to the dark red solution (in for example ethylenedichloride) of the Vilsmeier intermediate with stirring at a temperature in the region of 0° to 45° C. until the dark red colour of the solution has changed to pale yellow, and then pouring the mixture into water and isolating the borane/amine complex with ether.

Valuable modifications of the above general process include (i) The selection of reaction conditions under which formation of the amino-borane complex is minimised.

It is preferable to use a borohydride such as sodium or lithium borohydride for this purpose. The quantity of borohydride employed should be slightly in excess of half of the molar proportion of phosgene employed in preparing the "iminium" intermediate. Thus, for example, when the starting material is a 3-enol ether of cortisone acetate, an excellent yield of the 6-dimethyl-aminomethyl derivative may be obtained by employing 2.0 molar proportions of phosgene in the preparation of the "iminium" complex and effecting the reduction of the desired "iminium" complex with ca. 1.05 molar proportions of, for example, lithium borohydride in an inert organic solvent such for example as tetrahydrofuran.

(ii) The selection of reaction conditions particularly suitable for the reduction of "iminium" intermediates containing readily reducible groups such for example as 17-oxo, 20-oxo-groups, and cortical side chains.

Reduction of readily reducible groups such as 17-oxo and 20-oxo groups may be minimised by adding to the solution of the "iminium" intermediate a strong base such for example as phenazone or triethylamine before adding the appropriate quantity of the reducing agent. The quantity of strong base added is not critical and conveniently may fall within the limits of 1 to 2 molar proportions.

As will be apparent to those skilled in the art, the hydrogen ions formed during the formation of the iminium intermediate may react with the reducing agent. If so desired, this side reaction may be avoided by adding a hydrogen ion scavenger such for example as propylene oxide to the solution of the "iminium" intermediate prior to its reduction. In general, major improvements in yield do not result from such a procedure.

The reducing agent is preferably added in solution in a suitable dry organic solvent, e.g. Li and Zn borohydrides in tetrahydrofuran, Zn borohydride in ether, Na borohydride in pyridine or diglyme, K borohydride in triglyme. It is important to ensure anhydrous conditions. Reduction is generally complete in 5 to 30 minutes. The mixture may then be poured into water, preferably containing $NaHCO_3$ or $KHCO_3$ and the product extracted with ether.

It will be apparent to those skilled in the art that 6- aminoethyl derivatives (II; where R''' is aryl) will not form borane complexes.

Conversion of the 6-aminomethyl-3-enol ethers into water-soluble salts with pharmaceutically acceptable acids may be accomplished by methods of prior art. As the amines including Formula I are weak tertiary bases, it will be apparent to those skilled in the art that their salts may undergo partial hydrolysis in contact with water. In general such partial hydrolysis may be avoided by adjusting the pH of their solutions to ca. 2 to 3 by addition of the pharmaceutically acceptable acid.

The starting materials employed in the specific examples hereinafter set forth were prepared by methods well-known to those skilled in the art (see Ercoli and Gardie, J.A.C.S., 1960, 82, 746) and in particular by reacting the 3-oxo-Δ⁴-steroid with methyl or ethyl orthoformate in a suitable solvent such as dioxan in the presence of a catalytic quantity of a suitable acid such as sulphuric or toluene-p-sulphonic acid.

The process of the invention may be used in the preparation of 6-aminomethyl-3-enol ethers of the following steroids and acyl derivatives thereof:

Testosterone, 2-methyltestosterone, 17α-methyltestosterone and their 9(11)-dehydro, 11-oxo and 11-hydroxy derivatives
17α-acyloxyprogesterone and its 9(11)-dehydro, 11-oxo and 11-hydroxy derivatives
16-methyl-17α-acyloxyprogesterone and its 9(11)-dehydro, 11-oxo and 11-hydroxy derivatives
21-fluoro - 16 - methyl - 17α - acyloxyprogesterone and its 9(11)-dehydro, 11-oxo and 11-hydroxy derivatives
16-methylene-17α-acyloxyprogesterone and its 9(11)-dehydro, 11-oxo and 11-hydroxy derivatives
21-fluoro-16-methylene-17α-acyloxyprogesterone and its 9(11)-dehydro, 11-oxo and 11-hydroxy derivatives
17α-acyloxy-16-ethylideneprogesterone
16α,17α - dimethylmethylenedioxyprogesterone and its 9(11)-dehydro, 11-oxo and 11-hydroxy derivatives
Cortisone
16-methylcortisone
21-methylcortisone
16-methylenecortisone
16α-hydroxy cortisone and the (16α,17α)-acetonide thereof
Hydrocortisone
16-methylhydrocortisone
21-methylhydrocortisone
16-methylenehydrocortisone
16α-hydroxyhydrocortisone and the (16α,17α)-acetonide thereof
17α,21-dihydroxypregna-4,9(11)-diene-3,20-dione
16-methyl-17α,21-dihydroxypregna-4,9(11) - diene - 3,20-dione
21-methyl-17α,21-dihydroxypregna-4,9(11) - diene - 3,20-dione
16-methylene-17α,21 - dihydroxypregna - 4,9(11) - diene-3,20-dione
16α-hydroxy - 17α,21 - dihydroxypregna-4,9(11) - diene-3,20-dione and the 16,17) acetonide thereof
21-fluoro-17α-hydroxypregna-4,9(11)-diene - 3,20 - dione and the (16,17) acetonide thereof
21-fluoro-17α-hydroxypregn-4-ene-3,11,20 - trione and the (16,17) acetonide thereof
21-fluoro-11,17α-dihydroxypregn-4-ene-3,20-dione and the (16,17) acetonide thereof
21-hydroxypregna-4,17(20)-dien-3-one
11-oxo-21-hydroxypregna-4,17(20)-dien-3-one
11,21-dihydroxypregna-4,17(20)-dien-3-one
9(11)-dehydro-21-hydroxypregna-4,17(20)-dien-3-one
3-oxopregna-4,17(20)-dienoic acid (esters)
3,11-dioxopregna-4,17(20)-dienoic acid (esters)
11-hydroxy-3-oxopregna-4,17(20)-dienoic acid (esters)
9(11)-dehydro-3-oxopregna-4,17(20)-dienoic acid (esters)
21-fluoro-17α-acyloxyprogesterone and the 9(11)-dehydro, 11-oxo and 11-hydroxy derivatives thereof
Progesterone
16-methylprogesterone, 16,17-methyleneprogesterone and 16,17-ethylidene progesterone
11-oxoprogesterone
9(11)-dehydroprogesterone
21-methylprogesterone
Diosgenone
16-methyl-16,17-dehydroprogesterone
16-carbalkoxyprogesterone
16-hydroxymethylprogesterone
3-(3-oxo-17β-hydroxyandrost-4-en-17α-yl)propionic acid
21-fluoroprogesterone
Androst-4-ene-3,17-dione and its 2α-methyl, 16β-methyl and 2α,16β-dimethyl derivatives
Androst-4-ene-3,17-dione containing ring C groups including Δ⁹,¹¹ 11-hydroxy and 11-oxo
Testololactone Following is a description by way of example of methods of carrying the invention into effect.

EXAMPLE 1

*Preparation of 17α,20:20,21-Bismethylenedioxy-6-Dimethylaminomethyl-3-Ethoxypregna-3,5-Dien-11-One*

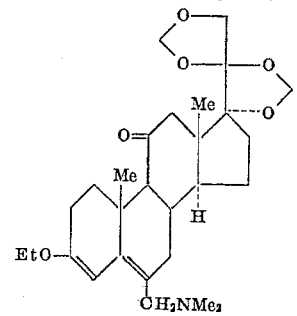

A suspension of 17α,20:20,21 - bismethylenedioxy - 3-ethoxypregna-3,5'-dien-11-one (4.6 g., prepared as described in Example 3 of our co-pending application No. 150,140, filed November 6, 1961,) in ethylenedichloride (25 ml.) containing a few drops of pyridine was added at 0° C. to a stirred suspension of the complex prepared from dimethylformamide (2.3 g.) and phosgene (1.6 g.) in ethylene dichloride (25 ml.). After four hours at room temperature, phenazone (3 g.) and a dry solution of sodium borohydride (0.4 g.) in pyridine (14 ml.) were added. After a further 1 hour at room temperature, the mixture was poured into dilute aqueous sodium carbonate and the product was extracted into ether. The extract was washed with water, dried over anhydrous sodium sulphate, evaporated to dryness, and the residue crystallised from aqueous methanol containing a trace of pyridine to give 17α,20:20,21-bismethylenedioxy-6-dimethylaminomethyl-3-ethoxypregna-3,5-dien - 11 - one as flakes, M.P. 187 to 190 C., $[\alpha]_D^{26}$ —140° (c., 0.56 in dioxan)

$\lambda_{max.}^{EtOH}$ 249 mμ (ε 19,550)

EXAMPLE 2

*Preparation of 17α-Acetoxy-6 - Dimethylaminomethyl - 3-Methoxy-16-Methylenepregna-3,5-Dien-20-One*

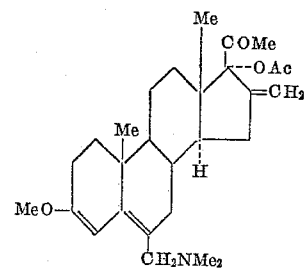

A suspension of 17α-acetoxy-3-methoxy-16-methylenepregna-3,5-dien-20-one (10 g., prepared as described in Example 8 of our co-pending application No. 150,140, filed November 6, 1961) in ethylene dichloride (30 ml.) containing 3 drops of pyridine was added at 0° C. to a stirred suspension of the complex prepared from dimethylformamide (5 ml.) and phosgene (3.4 g.) in ethylenedichloride (52 ml.). After 3 hours at room temperature lithium borohydride (0.5 g.) in dry tetrahydrofuran (50 ml.) was added. After a further 30 minutes the mixture was diluted with ether (500 ml.) and water (500 ml.). The aqueous layer was separated and the ether layer washed with a further 500 ml. water. The combined aqueous extracts were neutralised with aqueous sodium carbonate, the precipitated solid was collected, and recrystallised from aqueous methanol containing a trace of pyridine to give 17α - acetoxy - 6 - dimethylaminomethyl - 3- methoxy-16-methylene-pregna-3,5-dien-20-one as prisms, M.P. 153 to 154° C., $[\alpha]_D^{22}$ —226°±3 (c., 0.979 in chloroform), $\lambda_{max.}^{EtOH}$ 249–250 m$\mu$ ($\epsilon$ 20,800)

EXAMPLE 3

*Preparation of 6-Dimethylaminomethyl-3 - Ethoxy - 16α, 17α-Isopropylidenedioxypregna-3,5-Dien-20 - One Borane*

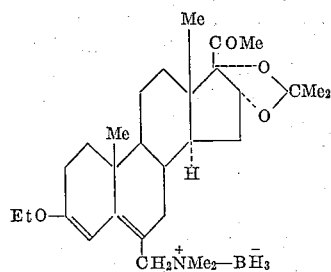

A solution of phosgene (2.9 g.) in ethylenedichloride (29 ml.) was added dropwise over 20 minutes to a stirred mixture of dimethylformamide (4.4 ml.) and ethylenedichloride (16 ml.) at 0° C. After stirring for a further 10 minutes a solution of 3-ethoxy-16α,17α-isopropylidenedioxypregna-3,5-dien-20-one (4.0 g.) (prepared as described in Example 1 of our co-pending application No. 150,140, filed November 6, 1961) in ethylenedichloride (20 ml.) was added and the mixture stirred at room temperature for 2 hours.

A filtered solution of lithium borohydride (0.8 g.) in dry tetrahydrofuran (40 ml.) was then added dropwise during 15 minutes. The reaction mixture was then poured into water and the product extracted with ether. The ethereal extract was washed with water, dried and the solvent evaporated in vacuo. The residue was dissolved in a little acetone which was removed in vacuo to eliminate traces of ethylenedichloride and the crystalline residue thus obtained recrystallised from acetone/methanol giving 6-dimethylaminomethyl-3 - ethoxy - 16α, 17α-isopropylidenedioxypregna-3,5-dien-20-one borane, as rods, M.P. 197 to 201° C., $\lambda_{max.}$ 256 m$\mu$ ($\epsilon$ 20,680), $[\alpha]_D^{23}$ —69° (c., 0.65 in dioxan)

$\gamma_{max.}^{CHCl_3}$ 2374, 2273, 1713, 1638, 1608, 1212, 1167, 1092, 1043 and 1019 cm.$^{-1}$

EXAMPLE 4

*Preparation of 6-Dimethylaminomethyl-3 - Ethoxy - 16α, 17α-Isopropylidenedioxypregna-3,5-Dien-20-One*

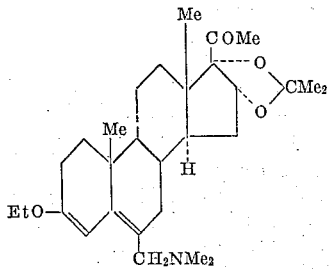

The reaction of 3-ethoxy-16α,17α-isopropylidenedioxypregna-3,5-dien-20-one (4.0 g.) with the complex prepared from dimethylformamide (4.4 ml.) and phosgene (2.9 g.) was carried out as in the foregoing example. Phenazone (2.8 g.) was then added, followed by sodium borohydride (0.32 g.) in pyridine solution (6.9 ml.) added dropwise whilst stirring over 15 minutes. The mixture was stirred for a further 15 minutes and then poured into a 2% solution of potassium carbonate in water (500 ml.). The reaction product was extracted with ether, the extract washed, dried, and the solvent evaporated in vacuo. The residue was dissolved in a little benzene, which was removed in vacuo to eliminate traces of pyridine. Crystallisation from aqueous acetone gave 6-dimethylaminomethyl-3-ethoxy-16α,17α-isopropylidenedioxypregna-3,5-dien-20-one as needles, M.P. 158 to 161° C., $[\alpha]_D^{26}$ —62° (c., 0.66 in dioxan)

$\lambda_{max.}^{EtOH}$ 251 m$\mu$ ($\epsilon$ 18,630)

EXAMPLE 5

*Preparation of 17β-Acetoxy-3-Ethoxy-6-(N-Methyl-N-Phenylaminomethyl)-Androsta-3,5-Diene*

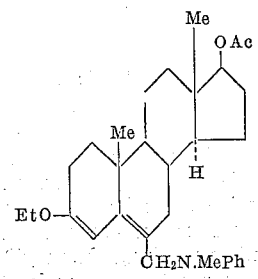

A solution of 17β-acetoxy-3-ethoxyandrosta-3,5-diene (U.S. Patent No. 2,742,485) (7 g.) in ethylenedichloride (30 ml.) containing some pyridine was added at 0° C. to a stirred solution of the complex prepared from N-methylformanilide (6 ml.) and phosgene (2.2 g.) in ethylenedichloride (45 ml.). After 1 hour at room temperature, a dry solution of sodium borohydride (0.55 g.) in pyridine (12 ml.) was added and the mixture was stirred for a further 10 minutes. It was then poured into dilute aqueous sodium carbonate, extracted with ether, the extract was washed with water, dried over anhydrous sodium sulphate and evaporated to dryness. The residue crystallised from methanol containing a trace of pyridine to give 17β-acetoxy-3-ethoxy - 6 - (N-methyl-N-phenylaminomethyl)-androsta-3,5-diene as needles, M.P. 152 to 154° C., $[\alpha]_D^{25}$ —129.2° (c., 0.85 in dioxan), $\lambda_{max.}^{EtOH}$ 255 m$\mu$ ($\epsilon$ 31,530)

EXAMPLE 6

*Preparation of 6-Dimethylaminomethyl-3-Ethoxy-17β-Hydroxyandrosta-3,5-Diene Borane*

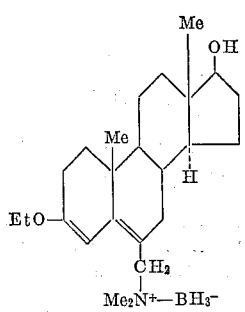

A solution of dimethylformamide (5 ml.) in ethylenedichloride (20 ml.) was cooled to 0° C. and stirred during the dropwise addition, over 30 minutes of phosgene (3.15 g.) in ethylenedichloride (31 ml.). After a further 10 minutes, androstenedione 3-enol ethyl ether (Serini and Koster, Ber., 1938, 71, 1766) (5 g.) in ethylenedichloride (25 ml.) was added, and the mixture stirred at room temperature for four hours. A 2% solution (75 ml.) of lithium borohydride in tetrahydrofuran was added dropwise to the stirred mixture, which was then poured into water and the product isolated with ether. Crystallisation form aqueous methanol gave the amine-borane as crystals, melting indefinitely between 168° and 178° C. and decomposing at about 215° C.

$\gamma_{max.}^{Nujol}$ 3500, 2400, 2340, 2300, 1740, 1645, and 1605 cm.$^{-1}$

EXAMPLE 7

*Preparation of 6 - Dimethylaminomethyl-3-Methoxy-17α-Methyl-17β-Propionoxyandrosta-3,5-Diene Borane*

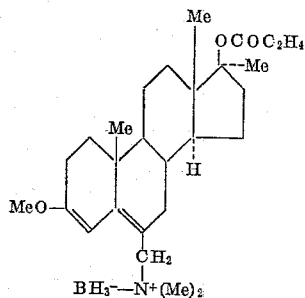

A Vilsmeier reagent was prepared from dimethylformamide (1.8 ml.) in ethylenedichloride (10 ml.) and phosgene (1.2 g.) in ethylenedichloride (12 ml.). The 3-enol methyl ether of 17α-methyltestosterone propionate (5 g.) in ethylenedichloride (20 ml.) was added and the mixture stirred at room temperature for 2 hours. Lithium borohydride (1 g.) in tetrahydrofuran (50 ml.) was added dropwise during 10 minutes, after which the mixture was poured into water and the product isolated with ether. Filtration of a benzene solution through a short column of alumina gave a solid which was purified from aqueous methanol to give the amine-borane, prisms, M.P. 149 to 152° C., $\gamma_{max.}^{Nujol}$ 2380, 2320, 2300, 1745, 1650 and 1610 cm.$^{-1}$

EXAMPLE 8

*Preparation of 17β-Acetoxy-3-Ethoxy-6-Dimethylaminomethylandrosta-3,5-diene*

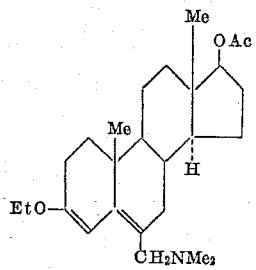

(a) The Vilsmeier reagent was prepared from dimethylformamide (12.5 ml.) in ethylenedichloride (20 ml.) and phosgene (8.4 g.) in ethylenedichloride (80 ml.), and treated with testosterone acetate 3-enol ethyl ether (25 g.) in ethylenedichloride (100 ml.) containing pyridine (0.3 ml.). After stirring for 1.5 hours the solution was treated dropwise with the pyridine/borane complex (7.8 g.; 1.2 mols) in anhydrous ether (110 ml.). The mixture was stirred 1 hour then poured into water. Neutral by-products were removed by extraction with ether, then the aqueous layer was treated with sodium carbonate (10 g.) and extracted with ether. The solution was washed, dried ($Na_2SO_4$) and evaporated. The residue was dissolved in benzene and passed through chromatographic alumina (300 g.). Elution with benzene/ether (10:1) and purification from aqueous methanol gave 17β - acetoxy-3-ethoxy-6-dimethylaminomethylandrosta-3,5-diene in prisms, M.P. 92 to 94° C., $\lambda_{max.}$ 250 to 251 mμ (ε 20,370) in ethanol, $[\alpha]_D^{20}$ —136° (c., 0.99 in dioxan), $\gamma_{max.}$ (in $CHCl_3$) 1723, 1644 and 1618 cm.$^{-1}$.

(b) The Vilsmeier reagent was prepared from dimethylformamide (12.5 ml.) in ethylenedichloride (20 ml.) and phosgene (8.4 g.) in ethylenedichloride (80 ml.) and treated with testosterone acetate 3-enol ethyl ether (25 g.) in ethylenedichloride (100 ml.) containing pyridine (0.3 ml.). After stirring for 1.5 hours the solution was treated with phenazone (20 g.) followed by a solution of sodium borohydride (2.8 g.; 1.06 mols) in anhydrous pyridine (100 ml.), aded dropwise. After a further 20 minutes stirring the product was isolated as in Example 8(a) to give 17β-acetoxy-3-ethoxy-6-dimethylaminomethylandrosta-3,5-diene, M.P. 92 to 94° C.

(c) The Vilsmeier reagent was prepared from dimethylformamide (12.5 ml.) in ethylenedichloride (20 ml.) and phosgene (8.4 g.) in ethylenedichloride (80 ml.), and treated with testosterone acetate 3-enol ethyl ether (25 g.) in ethylenedichloride (100 ml.), containing pyridine (0.3 ml.). After stirring for 1.5 hours the solution was treated with 1,2-epoxypropane (20 ml.), stirred for another 1 hour, then treated dropwise with sodium borohydride (1.35 g.; 1 mol) in anhydrous pyridine (50 ml.). After a further 20 minutes stirring, the product was isolated by pouring into dilute sodium carbonate, extracting with ether, and purification by chromatography as in Example 8(a) to give 17β-acetoxy-3-ethoxy-6-dimethylaminomethylandrosta - 3,5 - diene, M.P. 92 to 94° C.

(d) The Vilsmeier reagent was prepared from dimethylformamide (12.5 ml.) in ethylenedichloride (20 ml.) and phosgene (8.4 g.) in ethylenedichloride (80 ml.), and treated with testosterone acetate 3-enol ethyl ether (25 g.) in ethylenedichloride (100 ml.) containing pyridine (0.3 ml.). After stirring for 1.5 hours the solution was treated with diborane gas in a slow stream of dry nitrogen, with vigorous stirring to disperse the gas. After 1.5 hours the colour of the solution had faded to pale yellow. The product was isolated as in Example 8(a) to give -1β-acetoxy-3-ethoxy-6-dimethylaminomethylandrosta-3,5-diene, M.P. 92 to 94° C.

EXAMPLE 9

*Preparation of 17β-Acetoxy-3-ethoxy-6-Dimethylaminomethylandrosta-3,5-Diene Borane*

The Vilsmeier reagent was prepared from dimethylformamide (12.5 ml.) in ethylenedichloride (20 ml.) and phosgene (8.4 g.) in ethylenedichloride (80 ml.), and treated with testosterone acetate 3-enol ethyl ether (25 g.) in ethylenedichloride (100 ml.) containing pyridine (0.3 ml.). The mixture was stirred for 1.5 hours then treated dropwise with a saturated solution of sodium borohydride in anhydrous dimethylene glycol dimethyl ether until the red colour was just discharged (about 5 g. of sodium borohydride were required). The solution was treated with a rapid stream of gaseous carbon dioxide for 15 minutes then poured into water. The product was extracted with ether, which was washed and evaporated. Purification from acetone/methanol gave 17β - acetoxy-3-ethoxy-6-dimethylaminomethylandrosta-3,5-diene borane in prisms, M.P. 176 to 180° C., $[\alpha]_D^{18}$ —131° (c., 1.02 in $CHCl_3$), $\lambda_{max.}$ 255 mμ (ε 21,340) in ethanol, $\gamma_{max.}$ 2373, 2318, 2273, 1740, 1639 and 1606 cm.$^{-1}$ (in $CCl_4$).

EXAMPLE 10

*Preparation of 17β-Acetoxy-3-Ethoxy-6-Dimethylaminomethylandrosta-3,5-Diene*

17β-acetoxy-3-ethoxy -6- dimethylaminomethylandrosta-3,5-diene borane [prepared as described in Example 9] (1 g.) was refluxed in piperidine (10 ml.) for 4 hours. After cooling, some insoluble material was removed by filtration and the mother-liquor was evaporated to dryness under reduced pressure. Crystallisation of the residue from aqueous methanol gave 17β-acetoxy-3-ethoxy-6-dimethylaminomethylandrosta-3,5-diene as needles, M.P. 92 to 94° C. identical with that prepared in Example 8.

EXAMPLE 11

*Preparation of 3-Ethoxy-6-Dimethylaminoethyl-17β Propionoxyandrosta-3,5-Diene Borane*

Testosterone propionate 3-enol ethyl ether (see German Patent No. 1,068,256), treated by the process of Example 9 gave 3-ethoxy-6-dimethylaminomethyl-17β-propionoxyandrosta-3,5-diene borane, $\lambda_{max.}$ 255 M$\mu$ ($\epsilon$=20,890) in ethanol.

EXAMPLE 12

*Preparation of 17β-Acetoxy-3-Methoxy-6-Dimethylaminomethylandrosta-3,5-Diene Borane*

Testosterone acetate 3-enol methyl ether, treated by the process of Example 9 gave 17β-acetoxy-3-methoxy-6-dimethylaminomethylandrosta-3,5-diene borane in prisms, M.P. 140 to 144° C., $[\alpha]_D^{25}$ —135° (c., 1.27 in $CHCl_3$), $\lambda_{max.}$ 254 to 255 m$\mu$, ($\epsilon$ 19,310) in ethanol.

EXAMPLE 13

*Preparation of 17α-Acetoxy-3-Ethoxy-6-Dimethylaminomethylpregna-3,5-Dien-20-One and its Borane Adduct*

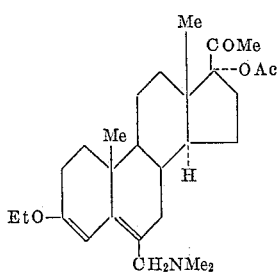

(a) Dimethylformamide (10 ml.) in ethylenedichloride (10 ml.) was stirred at 0° C. and treated dropwise with a 10% solution of phosgene in ethylenedichloride (67 ml.). A solution of 17α-acetoxy-3-ethoxypregna-3,5-dien-20-one (20 g.) in ethylenedichloride (50 ml.) and pyridine (2 drops) was added, and the mixture was stirred and allowed to warm to room temperature for 2 hours to form the iminium derivative. A saturated solution of lithium borohydride in anhydrous tetrahydrofuran was added dropwise until the red colour of the mixture was just discharged. The mixture was then poured into water and extracted with ether.

The ether was washed with dilute sodium bicarbonate solution and water, dried and evaporated. The residue was purified from acetone/hexane followed by ethanol to give 17α-acetoxy-3-ethoxy-6-dimethylaminoethylpregna-3,5-dien-20-one borane in flakes, M.P. 173 to 176° C., $[\alpha]_D^{24}$—132° (c., 1.08 in $CHCl_3$) $\lambda_{max.}$ 255 to 256 M$\mu$ ($\epsilon$ 22,180) in ethanol, $\lambda_{max.}$ 2366, 2311, 2267, 1738, 1717, 1638 and 1605 cm.$^{-1}$ (in $CCl_4$).

The aqueous phase remaining after the ether extraction was treated with a stream of air to remove ether, then stirred during the addition of potassium carbonate (5 g.). The precipitated solids were purified from aqueous methanol to give 17α-acetoxy-3-ethoxy-6-dimethylaminomethylpregna-3,3-dien-20-one in flakes, M.P. 124 to 127° C., or 150 to 151° $[\alpha]_D^{22}$ —145° (c.,1.09 in dioxan), $\lambda_{max.}$ 250.5 m$\mu$ ($\epsilon$ 20,590) in ethanol, $\gamma_{max.}$ 1738, 1719, 1648 and 1620 cm.$^{-1}$ (in $CCl_4$).

(b) The preparation of the iminium derivative in Example (a) was repeated, then the solution was treated with phenazone (15 g.) followed by lithium borohydride (0.9 g. in anhydrous tetrahydrofuran (70 ml.), added dropwise. The mixture was then poured into dilute sodium bicarbonate solution, and the product isolated with ether and purified from aqueous methanol to give 17α-acetoxy-3-ethoxy - 6 - dimethylaminomethylpregna - 3,5-dien-20-one, M.P. 124 to 127° C., or 150 to 151° C.

EXAMPLE 14

*Preparation of 17α-Acetoxy-3-Ethoxy-6-Dimethylaminomethylpregna-3,5-Dien-20-One Citrate*

The process of the previous example was repeated, but the product was not purified directly. Instead, the total crude material was dissolved in anhydrous ether (400 ml.) and treated dropwise with a solution of citric acid monohydrate (12.5 g.) in 500 ml. anhydrous ether. The precipitated solids were collected, washed thoroughly with ether, and dried at 65° C. in vacuo to give 17α-acetoxy-3-ethoxy-6-dimethylaminomethylpregna - 3,5 - dien-20-one citrate, hydrated crystals, M.P. 128 to 132° C., $[\alpha]_D^{25}$ —99° (c., 0.79 in dioxan), $\lambda_{max.}$ 255.5 m$\mu$ (in ethanol).

EXAMPLE 15

*Preparation of 6-Dimethylaminomethyl Cortisone Acetate 3-Enol Ethyl Ether*

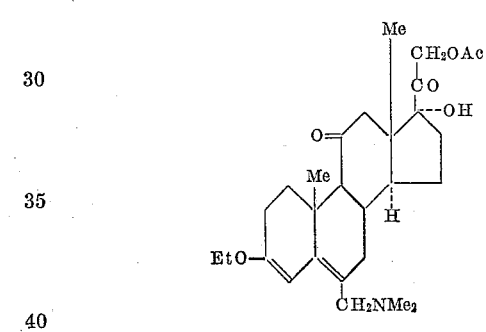

Dimethylformamide (6.6 ml.) was stirred at 0° C. and treated dropwise with a 10% solution of phosgene in ethylenedichloride (38 ml.), then a solution of cortisone acetate 3-enol ethyl ether (J. Amer. Chem. Soc., 1952, 74, 2248) (10 g.) in ethylenedichloride (50 ml.) was added. After stirring for 1 hour, the temperature being allowed to rise, an orange-yellow precipitate formed. Phenazone (5 g.) was added, followed by a solution of dry sodium borohydride (0.74 g.) in anhydrous pyridine (26 ml.) added dropwise. After stirring for a further ¼ hour the mixture was poured into water (1 litre), and the mixture was extracted twice with ether. The aqueous layer was then treated with sodium carbonate (5 g.) and re-extracted with ether. This extract was washed with water, dried ($Na_2SO_4$), stirred with charcoal, filtered and the solvent removed, to give 6-dimethylaminomethylcortisone acetate 3-enol ethyl ether, $[\alpha]_D^{21}$ +22° (c., 0.98 in dioxan), $\lambda_{max.}$ 250 m$\mu$ ($\epsilon$ 18,560) in ethanol, $\lambda_{max.}$ (in $CCl_4$) 3609, 3495, 3085, 2763, 2710, 1756, 1728, 1708, 1646 and 1618 cm.$^{-1}$.

EXAMPLE 16

*Preparation of 6-Dimethylaminomethyl Cortisone Acetate 3-Enol Ethyl Ether Hydrochloride*

The previous example was repeated, but the reduced reaction mixture was treated with hydrochloric acid and only a small volume of water (50 ml.) followed by ether (250 ml.). The resulting precipitate was collected and washed with ether, and purified from ethanol/ether to give 6-dimethylaminomethyl cortisone acetate 3-enol ethyl ether hydrochloride, needles, M.P. 164 to 170° (decomp.), $[\alpha]_D^{24}$ —5° (c., 0.63 in ethanol) $\lambda_{max.}$ 258.5 m$\mu$ ($\epsilon$ 19,100) in ethanol.

EXAMPLE 17

*Preparation of 6-Dimethylaminomethyl-19-Nor-3-Ethoxyandrost-3,5-Dien-17β-Acetate Borane*

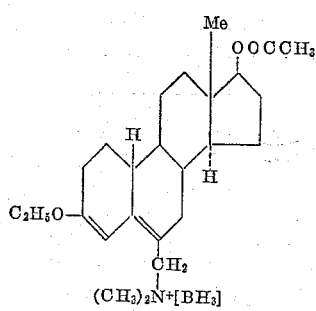

8 ml. of a solution of phosgene in ethylenedichloride (10% w./v.) were added over 15 minutes to a stirred, cooled solution of dimethylformamide (1.23 ml.) in ethylenedichloride (10 ml.). After a further 15 minutes stirring, a solution of 2.30 g. of 19-nor-3-ethoxy-androst-3,5-dien-17β-acetate (Ercoli and Gardi, J. Amer. Chem. Soc., 1960, 82, 746) in ethylenedichloride (15 ml.) was added, and the mixture stirred for 3 hours at room temperature. A filter solution of lithium borohydride (0.45 g.) in tetrahydrofuran (22.5 ml.) was added dropwise and the mixture was poured into water cautiously, and extracted with ether. The ether solution was washed, dried and stripped. Acetone was added and distilled off, and the desired product crystallised spontaneously. It was purified by recrystallisation from acetone/methanol, M.P. 187 to 187.5° C., $[\alpha]_D$ −160–164° (c., 0.654 in $CHCl_3$), $\lambda_{max}$. 255–256 m$\mu$ ($\epsilon$=20,446), $\gamma_{max}^{CCl_4}$ (Infracord determination) 2365, 2270, 1740, 1640, 1600, 1235, 1200, 1165

$\gamma_{max}^{Nujol}$ (Infracord determination) 1042, 1024, 1018, 912, 815, 807

EXAMPLE 18

*Preparation of 6-Dimethylaminomethyl-3-Ethoxy-Pregna-3,5,17(20)-Trien-21-Ethyl-Oate Borane*

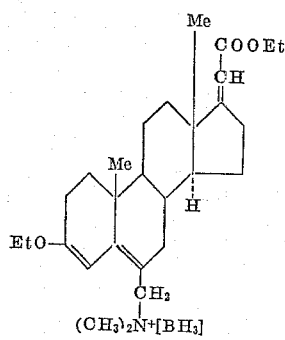

6.6 ml. of a solution of phosgene in ethylenedichloride (10% w./v.) were added over 5 minutes to a stirred solution of 1 ml. of dimethylformamide in ethylenedichloride (4 ml.) at 0° C. After a further 10 minutes stirring, a solution of 2.1 g. of 3-ethoxy-pregna-3,5,17(20)-trien-21-ethyl-oate (Patel, Petrow, Roger and Stuart-Webb, J., 1952, 161) in ethylenedichloride (16.4 ml.) was added, and the mixture was stirred at room temperature for 2½ hours. A filtered solution of lithiumborohydride (0.4 g.) in tetrahydrofuran (20 ml.) was added dropwise, and the solution was poured into water, extracted with ether, and the ether washed, dried and stripped. Acetone was added and distilled off, and the residue crystallised on trituration with ether. It was purified by recrystallisation from acetone/methanol, M.P. 141 to 143.5° C., $[\alpha]_D$ −140.1° (c., 0.767 in $CHCl_3$), $\lambda_{max}$. 254.5 to 256 m$\mu$ ($\epsilon$=22,180), and $\lambda_{max}$. 223 to 225 m$\mu$ ($\epsilon$=20,590), $\gamma_{max}^{CCl_4}$ (Infracord determination) 2370, 2320, 2275, 2060, 1715, 1655, 1645, 1605, 1460, 1430, 1380, 1365, 1345, 1335

$\gamma_{max}^{Nujol}$ (Infracord determination) 1225, 1215, 1180, 1160, 1110, 1030, 868, 808

EXAMPLE 19

*Preparation of 6-Dimethylaminomethyl-3-Ethoxy-21-Acetoxy-Pregna-3,5,17(20)-Triene Borane*

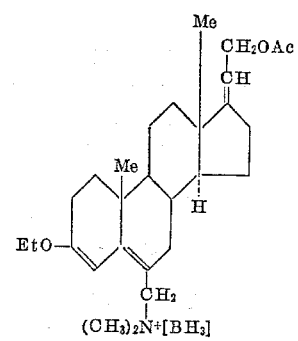

14.5 ml. of a solution of phosgene in ethylenedichloride (10% w./v.) was added at 0° C., to a stirred solution of 2.15 ml. of dimethylformamide in 8.6 ml. of ethylenedichloride, during 5 minutes and the solution was stirred for a further 10 minutes. A solution of 4.6 g. of 3-ethoxy-21-acetoxypregna-3,5,17(20)-triene in 36.8 ml. of ethylenedichloride was added and the mixture was stirred at room temperature for a further 4 hours. A filtered solution of lithium borohydride (0.875 g.) in tetrahydrofuran (44 ml.) was added dropwise, and the solution was poured into water, extracted with ether and the ether washed, dried and stripped. Acetone was added and distilled off. The product was purified from acetone/methanol, $[\alpha]_D$−97.3° (C., 1.011 in $CHCl_3$), $\gamma_{max}$. 255.5 m$\mu$ ($\epsilon$=17220)

$\gamma_{max}^{CCl_4}$ 2365, 2310, 2270, 2050, 1735, 1670, 1635, 1600, 1458, 1445, 1420, 1375, 1350, 1165 (Infracord determination)

EXAMPLE 20

*Preparation of 3-(6-Dimethylaminomethyl-3-Ethoxy-17β-Hydroxyandrosta-3,5-Dien-17α-Yl)Propionic Acid Lactone*

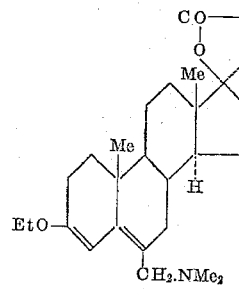

A suspenion of 3-(3-ethoxy-17β-hydroxyandrosta-3,5-dien-17α-yl)propionic acid lactone [M.P. 174 to 176° C., $[\alpha]_D^{25}$ +172°, prepared from 3-(17β-hydroxy-3-oxo-androst-4-en-17α-yl) propionic acid lactone (U.S. specification No. 2,705,712)] (5 g.) in ethylenedichloride (25 ml.) containing three drops of pyridine was added at 0° C., to a stirred suspension of the complex obtained from dimethyl formamide (2.2 g.) and phosgene (1.7 g.) in ethylenedichloride (25 ml.). The mixture was stirred at room temperature for 2 hours, treated with phenazone (3 g.), and then a dry solution of sodium borohydride (0.4 g.) in pyridine. After a further ½ hour at room temperature, the mixture was poured into aqueous sodium bicarbonate and the product isolated with ether. Crystallization gave 3-(6-dimethylaminomethyl-3-ethoxy-17β-hydroxyandrosta-3,5-dien-17α-yl)-propionic acid lactone, $\lambda_{max.}$ 251 mμ (log ε 4.27), $\gamma_{max.}^{Nujol}$ 1545, 1520, 1210 cm.$^{-1}$

EXAMPLE 21

*Preparation of 17β-Acetoxy-6-Dimethylaminomethyl-17α-Ethyl-3-Methoxyandrosta-3,5-Diene*

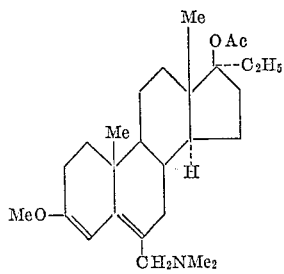

A solution of 17β-acetoxy-17α-ethyl-3-methoxyandrosta-3,5-diene (prepared from 17α-ethyl testosterone acetate) (4 g.) in ethylenedichloride (25 ml.) containing a few drops of pyridine was added to the complex prepared from dimethylformamide (4.4 ml.) and phosgene (2.9 g.) in ethylenedichloride (25 ml.). Phenazone (3 g.) was then added, followed by sodium borohydride (0.35 g.) in pyridine (10 ml.). The mixture was stirred for 15 minutes, then poured into dilute aqueous potassium carbonate, and the product isolated with ether. Crystallisation gave 17β-acetoxy-6-dimethylaminomethyl-17α-ethyl-3-methoxyandrosta-3,5-diene, $\lambda_{max.}$ 250 mμ (log ε 4.26), $\gamma_{max.}^{Nujol}$ 1730, 1540, 1515, 1210 cm.$^{-1}$

EXAMPLE 22

*Preparation of 3-Benzyloxy-6-Dimethylaminomethylandrosta-3,5-Dien-17-One*

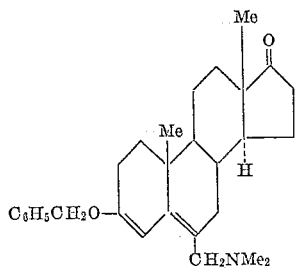

Androstenedione 3-enol benzyl ether (M.P. 175 to 176° C. prepared from androstenedione 3-enol ether and benzyl alcohol by the azeotropic removal of ethanol by distillation in benzene in the presence of toluene-p-sulphonic acid) (12 g.) was added in ethylenedichloride (50 ml.) to the reagent prepared from dimethylformamide (6 ml.) and phosgene (4 g.) in ethylenedichloride (40 ml.). After stirring for 1 hour at room temperature phenazone (8 g.) was added, followed by sodium borohydride (0.87 g.) in anhydrous pyridine (15.8 ml.). The mixture was stirred for a further 10 minutes, poured into dilute sodium carbonate solution, and the product extracted with ether. The organic layer was washed, dried (Na$_2$SO$_4$) and the solvents removed. The residue, in benzene, was percolated through chromatographic alumina (50 g.). After removal of the solvent, purification from aqueous acetone gave 3-benzyloxy-6-dimethylaminomethylandrosta-3,5-dien-17-one in needles, M.P. 141 to 146° C., $[\alpha]_D^{26}$ −77.5° (c., 1.27 in dioxan), $\lambda_{max.}$ 250.5 mμ (ε 21,250) in ethanol, $\gamma_{max.}$ (in CCl$_4$) 3085, 3065, 3032, 2762, 2714, 1741, 1648 and 1619 cm.$^{-1}$.

EXAMPLE 23

*Preparation of 3-Ethoxy-6-Dimethylaminomethylandrosta-3,5-Dien-17-One*

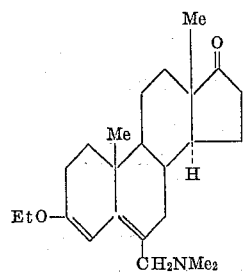

The procedure of the previous example was applied to androstenedione 3-enol ethyl ether (10 g.) giving 3-ethoxy-6-dimethylaminomethylandrosta-3,5-dien-17-one needles from aqueous acetone, M.P. 94 to 96° C., $[\alpha]_D^{26}$ −78° (c., 1.01 in dioxan), $\lambda_{max.}$ 249 mμ (ε 21,400) in ethanol, $\gamma_{max.}$ (in CCl$_4$) 3074, 2762, 2715, 1743, 1648 and 1618 cm.$^{-1}$.

The mother liquors gave the borane adduct, needles from acetone/methanol, M.P. 192 to 195° C., $[\alpha]_D^{24}$ −82° (c., 0.74 in CHCl$_3$), $\lambda_{max.}$ 256 to 257 mμ (ε=20,890) in ethanol, $\gamma_{max.}$ (in CCl$_4$) 2378, 2325, 2276, 1745, 1642, 1608, 1431, 1407 cm.$^{-1}$.

EXAMPLE 24

*Preparation of 21-Acetoxy-17-Hydroxy-3-(β-Hydroxyethoxy)-6-Dimethylaminomethylpregna-3,5-Diene-11,20-Dione*

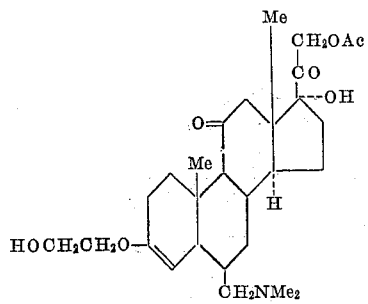

The procedure of Example 15 was applied to cortisone acetate 3-ethylene ketal (Antonucci et al., J. Org. Chem., 1953, 18, 70). The product was 21-acetoxy-17-hydroxy-3-(β-hydroxyethoxy)-6-dimethylaminomethylpregna-3,5-diene-11,20-dione, $\lambda_{max.}$ 250.5 mμ (ε=19,100) in ethanol.

EXAMPLE 25

*Preparation of 21-Acetoxy-3-Cyclopentyloxy-17-Hydroxy-6-Dimethylaminomethylpregna-3,5-Diene-11,20-Dione*

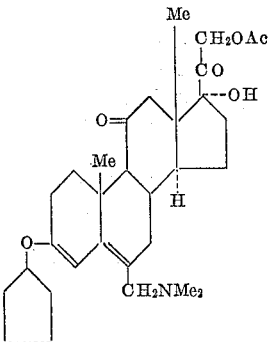

The procedure of Example 15 was applied to cortisone acetate 3-enol cyclopentyl ether [prepared from the corresponding ethyl ether by azeotropic distillation with benzene, cyclopentanol and a catalytic quantity of toluene-p-sulphonic acid, and purified from aqueous methanol +0.2% pyridine, needles, M.P. 169 to 172° C.]. The product was 21-acetoxy-3-cyclopentyloxy-17α-hydroxy-6-dimethylaminomethylpregna-3,5-diene-11,20-dione, λ$_{max}$. 250 mμ (ε=19,820) in ethanol.

EXAMPLE 26

21-acetoxy-3-cyclohexyloxy-17α-hydroxy-6-dimethylaminomethylpregna-3,5-diene-11,20-dione, λ$_{max}$. 250 mμ (ε=18,280) in ethanol, was prepared from cortisone acetate 3-enol cyclohexyl ether, M.P. 167 to 168° C., [α]$_D^{25}$ +74° (c., 0.92 in dioxan) by the procedure of Example 25.

EXAMPLE 27

21-acetoxy-3-benzyloxy-17α-hydroxy-6-dimethylaminomethylpregna-3,5-diene-11,20-dione, λ$_{max}$. 249.5 mμ (ε=18,720) in ethanol, was prepared from cortisone acetate 3-enol benzyl ether by the procedure of Example 25.

EXAMPLE 28

21-acetoxy-3-(3'-phenylpropyloxy)-17α-hydroxy-6-dimethylaminomethylpregna-3,5-diene-11,20-dione, λ$_{max}$. 249.5 mμ (ε=18,900) in ethanol, was prepared from cortisone acetate 3-enol 3'-phenylpropyl ether by the procedure of Example 25.

EXAMPLE 29

21-acetoxy-3-n-propyloxy-17α-hydroxy-6-dimethylaminomethylpregna-3,5-diene-11,20-dione, λ$_{max}$. 250 mμ (ε=19,240) in ethanol, was prepared from cortisone acetate 3-enol n-propyl ether (Ercoli and Gardi, J. Amer. Chem. Soc., 1960, 82, 746) by the procedure of Example 25.

EXAMPLE 30

21-acetoxy-3-isopropyloxy-17α-hydroxy-6-dimethylaminomethylpregna-3,5-diene-11,20-dione, λ$_{max}$. 249 mμ (ε=18,710) in ethanol, was prepared from cortisone acetate 3-enol isopropyl ether (Ercoli and Gardi, J. Amer. Chem. Soc., 1960, 82, 746) by the procedure of Example 25.

EXAMPLE 31

21-acetoxy-3-n-butyloxy-17α-hydroxy-6-dimethylaminomethylpregna-3,5-diene-11,20-dione, λ$_{max}$. 250 mμ (ε=18,800) in ethanol, was prepared from cortisone acetate 3-enol n-butyl ether (Ercoli and Gardi, J. Amer. Chem. Soc., 1960, 82, 746) by the procedure of Example 25.

EXAMPLE 32

21-acetoxy-3-sec.-butyloxy-17α-hydroxy-6-dimethylaminomethylpregna-3,5-diene-11,20-dione, λ$_{max}$. 250 mμ (ε=18,950) in ethanol, was prepared from cortisone acetate 3-enol sec.-butyl ether (Ercoli and Gardi, J. Amer. Chem. Soc., 1960, 82, 746) by the procedure of Example 25.

EXAMPLE 33

21-acetoxy-3-n-amyloxy-17α-hydroxy-6-dimethylaminomethylpregna-3,5-diene-11,20-dione, λ$_{max}$. 249 mμ (ε=18,125) in ethanol, was prepared from cortisone acetate 3-enol n-amyl ether (Ercoli and Gardi, J. Amer. Chem. Soc., 1960, 82, 746) by the procedure of Example 25.

EXAMPLE 34

21-acetoxy-3-n-hexyloxy-17α-hydroxy-6-dimethylaminomethylpregna-3,5-diene-11,20-dione, λ$_{max}$. 249.5 mμ (ε=18,730) in ethanol, was prepared from cortisone acetate 3-enol n-hexyl ether by the procedure of Example 25.

EXAMPLE 35

21-acetoxy-3-n-heptyloxy-17α-hydroxy-6-dimethylaminomethylpregna-3,5-diene-11,20-dione, λ$_{max}$. 249 mμ (ε=18,330) in ethanol, was prepared from cortisone acetate 3-enol n-heptyl ether by the procedure of Example 25.

EXAMPLE 36

*Preparation of 21-Acetoxy-17α-Hydroxy-3-Methoxy-6-Dimethylaminomethylpregna-3,5,9(11)-Trien-20-One*

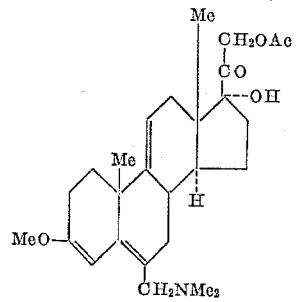

The procedure of Example 15 was applied to 21-acetoxy-17α-hydroxy-3-methoxypregna-3,5,9(11)-trien-20-one (prepared as described in our co-pending application No. 150,140, filed November 6, 1961). The product was 21-acetoxy-17α-hydroxy-3-methoxy-6-dimethylaminomethylpregna-3,5,9(11)-trien-20-one, prisms from acetone/hexane, M.P. 144 to 147° C., λ$_{max}$. 250.5 mμ (ε=19,720) in ethanol, [α]$_D^{25}$ −90° (c., 0.91 in dioxan), γ$_{max}$. (in CCl$_4$) 3608, 3515, 3080, 3041, 1755, 1733, 1652, 1622 cm.$^{-1}$.

EXAMPLE 37

*Preparation of 17α-Hydroxy-3-Methoxy-21-Methyl-6-Dimethylaminomethylpregna-3,5-Dien-11,20-Dione*

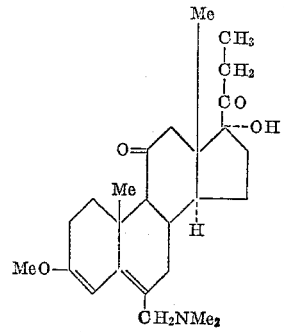

The procedure of Example 18 was applied to 17α-hydroxy-3-methoxy-21-methylpregna-3,5-diene-11,20-dione (prepared from cortisone acetate 3-ethylene ketal by reaction with ethyl magnesium iodide to give 20-ethyl-3,3-ethylenedioxy-17α,20,21-trihydroxypregn-5-en-11-one, M.P. 192 to 198° C., [α]$_D^{23}$ −21° (c., 0.94 in CHCl$_3$).

This trihydroxy compound was treated with sodium metaperiodate followed by sodium metabisulphite and acetic acid to give 17α-hydroxy-21-methylpregn-4-ene-3,11,20-trione, M.P. 248 to 252° C., and reaction of the latter compound with trimethylorthoformate in dioxan containing a catalytic amount of toluene-p-sulphonic acid. The product was 17α-hydroxy-3-methoxy-21-methyl-6-dimethylaminomethylpregna-3,5-diene-11,20-dione, λ$_{max}$. 249.5 mμ (ε=19,180) in ethanol.

EXAMPLE 38

*Preparation of 17α,20:20,21-Bismethylenedioxy-6-Dimethylaminomethyl-3-Ethoxypregna-3,5-Dien-11β-Ol*

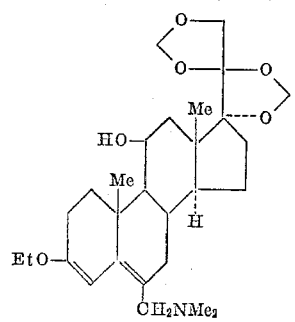

A solution of 17α,20:20,21-bismethylenedioxy-3-ethoxypregna-3,5-dien-11β-ol (5 g.) in dry ethylenedichloride (25 ml.) was added at 0° C. to a stirred suspension of the complex prepared from dimethylformamide (2.5 ml.) and phosgene (1.7 g.) in dry ethylenedichloride (30 ml.) and the stirred mixture was allowed to warm to room temperature over 4 hours. Phenazone (2 g.), followed by a dry solution of sodium borohydride in pyridine (3%, 15 ml.) were added and the product was isolated in the usual way. 17α,20:20,21-bismethylenedioxy-6-dimethylaminomethyl - 3 - ethoxypregna - 3,5-dien-11β-ol formed needles from aqueous methanol, M.P. 168 to 171° C., $[\alpha]_D^{20}$ —152 (c., 0.95 in dioxan), $\lambda_{max.}^{EtOH}$ 251 mμ (ε 20,710)

EXAMPLE 39

*Preparation of 17α-Acetoxy-6-Dimethylaminomethyl-3-Methoxy-16-Methylenepregna-3,5-Dien-20-One*

A solution of 17α-acetoxy-6-dimethylaminomethyl-3-methoxy-16-methylenepregna-3,5-dien-20-one borane (5 g., prepared by the method of Example 6) in piperidine (25 ml.) was heated under reflux for 4 hours. The product was isolated as in Example 10 and crystallised from methanol to give 17α-acetoxy-6-dimethylaminomethyl-3-methoxy-16-methylenepregna-3,5-dien-20-one as prisms, M.P. 152 to 154° C., identical with the material prepared in Example 2.

EXAMPLE 40

*Preparation of 6-Dimethylaminomethylcortisone Acetate 3-Enol Methyl Ether*

The procedure of Example 15 was applied to cortisone acetate 3-enol methyl ether. The product was 6-dimethylaminomethylcortisone acetate 3-enol methyl ether, needles from acetone/hexane, M.P. 164 to 166° C. $[\alpha]_D^{25}$ —5° (c., 0.79 in dioxan), $\lambda_{max.}$ 249.5 mμ (ε 19,470) in ethanol, $\gamma_{max.}$ (in CCl$_4$) 3604, 3490, 3088, 1755, 1733, 1702, 1649 and 1620 cm.$^{-1}$.

EXAMPLE 41

*Preparation of 16α,17α-Epoxy-6-Dimethylaminomethyl-3-Methoxypregna-3,5-Dien-20-One*

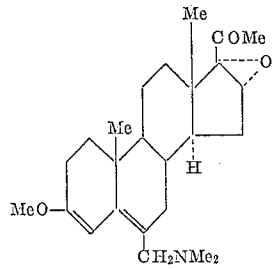

16α,17α-epoxy-3-methoxypregna-3,5-dien-20-one [prepared from 16α,17α-epoxyprogesterone and methyl orthoformate in dioxan with a catalytic amount of toluene-p-sulphonic acid, M.P. 196 to 202° C., $[\alpha]_D^{22}$ +151° (c., 0.9 in CHCl$_3$)] (6.75 g.) in ethylenedichloride (25 ml.) was added to the complex prepared at 0° C. from dimethylformamide (3. ml.) and phosgene (2.4 g. in 24 ml. ethylenedichloride). After stirring for 1 hour phenazone (3.7 g.) was added followed by sodium borohydride (0.75 g.) in pyridine (13.5 ml.). The resulting mixture was poured into sodium bicarbonate solution and the product extracted with ether. The organic layer was washed, dried (Na$_2$SO$_4$) and the solvent removed under reduced pressure at 25 to 30° C. The residual gum was dissolved in methanol and treated with potassium hydroxide (2.5 g.) for 1 hour at room temperature. Water was then added dropwise until the product separated out. Purification from acetone/hexane and aqueous acetone gave 16α,17α - epoxy - 6-dimethylaminomethyl-3-methoxypregna-3,5-dien-20-one, M.P. 169 to 172° C.,$[\alpha]_D^{26}$ —76° (c., 1.38 in dioxan), $\lambda_{max.}$ 250 mμ (20,060), $\gamma_{max.}$ (in CCl$_4$) 3073, 1706, 1648, 1618 cm.$^{-1}$.

EXAMPLE 42

*Preparation of 21-Acetoxy-6-Dimethylaminomethyl-3-Ethoxypregna-3,5-Dien-20-One*

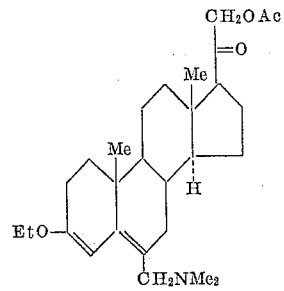

A solution of 21-acetoxy-3-ethoxypregna-3,5-dien-20-one (14 g.) in dry ethylenedichloride (70 ml.) was added at 0° C. to a stirred suspension of the complex prepared from dimethylformamide (5 g.) and phosgene (3.8 g.) in dry ethylenedichloride (60 ml.) and the mixture was allowed to warm to room temperature over 1½ hours. Phenazone (8.2 g.), followed by a dry solution of sodium borohydride in pyridine (4.9%, 11 ml.), were added and stirring was continued for 1 hour. The mixture was poured into dilute aqueous sodium carbonate and the steroidal material was extracted into ether. The extract was washed with water, dried over anhydrous sodium sulphate and evaporated to dryness under reduced pressure. 21 - acetoxy - 6-dimethylaminomethyl-3-ethoxypregna-3,5-dien-20-one had $\lambda_{max.}^{EtOH}$ 250 mμ (ε 19,650) and $\gamma_{max.}^{Nujol}$ 1745, 1725, 1660 and 1625 cm.$^{-1}$

EXAMPLE 43

*Preparation of 17β-Acetoxy-6-Dimethylaminomethyl-3-Ethoxy-2α-Methylandrosta-3,5-Diene*

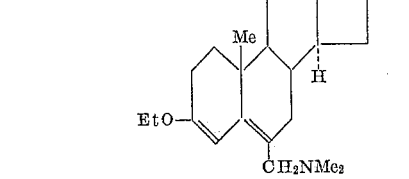

A solution of 17β-acetoxy-3-ethoxy-2α-methylandrosta-3,5-diene (6.5 g.) in ethylenedichloride (25 ml.) containing a trace of pyridine was added at 0° C. to a stirred suspension of the complex prepared from dimethylformamide (5.4 g.) and phosgene (2 g.) in ethylenedichloride (45 ml.) and the mixture was stirred at room temperature for 2 hours. Phenazone (3.6 g.) was then added, followed by a solution of sodium borohydride in dry pyridine (3%, 15 ml.). The product was isolated as described in Example 1 and gave 17β-acetoxy-6-dimethylaminomethyl-3-ethoxy-2α-methylandrosta-3,5-diene, $\lambda_{max.}^{EtOH}$ 250 mμ (ε 19,000), $\gamma_{max.}^{Nujol}$ 1727, 1655 and 1625 cm.$^{-1}$.

EXAMPLE 44

*Preparation of 3-Ethoxy-16α-Methyl-6-Dimethylaminomethylpregna-3,5-Dien-20-One*

The procedure of Example 22 was applied to 16α-methylprogesterone 3-enol ethyl ether giving 3-ethoxy-16α-methyl-6-dimethylaminomethylpregna-3,5-dien-20-one

EXAMPLE 45

*Preparation of 6-Dimethylaminomethyl-3-Ethoxy-16-Methylpregna-3,5,16-Trien-20-One*

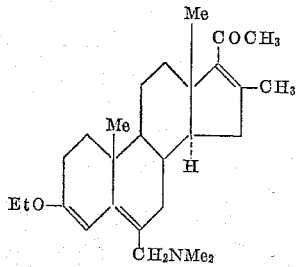

A suspension of 3-ethoxy-16-methylpregna-3,5,16-trien-20-one (5.6 g.) in ethylenedichloride (50 ml.) containing one drop of dry pyridine was added to the Vilsmeier reagent obtained from dimethylformamide (6.0 ml.) and phosgene (27 ml. of a 9% w./v. solution in ethylenedichloride) in the usual way. The mixture was stirred for 4 hours. A solution of phenazone (5.5 g.) in ethylenedichloride (30 ml.) was added, followed by a solution of sodium borohydride in dry pyridine (10 ml. containing 0.050 g./ml.) and all stirred for 2 hours. Finally, the solution was washed thoroughly with water, dried and evaporated. 6-dimethylaminomethyl-3-ethoxy-16-methylpregna-3,5,16-trien-20-one was obtained, $\gamma_{max.}^{CCl_4}$ 1645, 1660, 1690 and 3400 cm.$^{-1}$

EXAMPLE 46

*Preparation of 6-Dimethylaminomethyl-3-Methoxypregna-3,5-Dien-17α,21-Diol-11,20-Dione Diacetate*

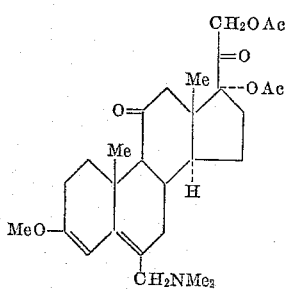

A solution of 3-methoxypregna-3,5-dien-17α,21-diol-11,20-dione diacetate (2.45 g.) in ethylenedichloride (20 ml.) was added to a stirred solution of the reagent from dimethylformamide (3.0 ml.) and phosgene (8.0 ml. of a 9% w./v. solution in ethylenedichloride). After stirring for 4 hours a solution of phenazone (1.7 g.) in ethylenedichloride (20 ml.) was added, followed by a solution of sodium borohydride in dry pyridine (4.5 ml. containing 0.050 g./ml.). After a further 2 hours stirring, the solution was thoroughly washed with water, dried and evaporated. 6-dimethylaminomethyl-3-methoxypregna-3,5-dien-17α,21-diol-11,20-dione diacetate was obtaind $\gamma_{max.}$ (liquid film) at 1600, 1670, 1710, 1745 and 3400 cm.$^{-1}$.

EXAMPLE 47

*Preparation of 6-Dimethylaminomethyl-3-Methoxyandrosta-3,5-Diene-17-One*

The process of Example 22 was applied to androstenedione 3-enol methyl ether giving 6-dimethylaminomethyl-3-methoxyandrosta-3,5-dien-17-one, M.P. 147° C., $[\alpha]_D^{23}$ —79.4 (c., 1.0 in dioxan), $\lambda_{max.}^{EtOH}$ 250 m$\mu$ ($\epsilon$ 20,310)

EXAMPLE 48

*Preparation of 17β-Acetoxy-6-Dimethylaminomethyl-3-Methoxyandrosta-3,5-Diene*

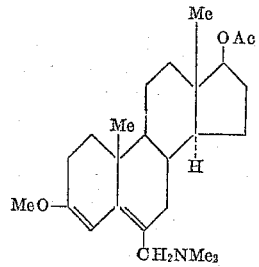

The process of Example 8a was repeated, using testosterone acetate 3-enol methyl ether as the starting material, to give 17β-acetoxy-6-dimethylaminomethyl-3-methoxyandrosta-3,5-diene, rods from aqueous methanol, M.P. 108 to 110° C., $[\alpha]_D^{24}$—135° (c., 0.925 in dioxan), $\lambda_{max.}$ 250 m$\mu$ ($\epsilon$=20,200) in ethanol, $\gamma_{max.}$ (in CCl$_4$) 3087, 2756, 2711, 1736, 1647 and 1620 cm.$^{-1}$.

EXAMPLE 49

*Preparation of 17α-Acetoxy-6-Dimethylaminomethyl-3-Methoxypregna-3,5-Dien-20-One*

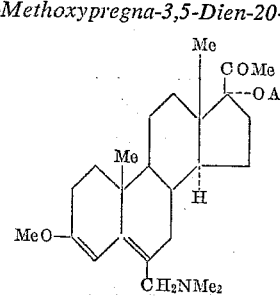

The process of Example 13a was repeated, using 17α-acetoxyprogesterone 3-enol methyl ether as the starting material, to give 17α-acetoxy-6-dimethylaminomethyl-3-methoxypregna-3,5-dien-20-one, prisms from aqueous methanol, M.P. 139.5 to 143° C., $[\alpha]_D^{20}$—146° (c., 0.95 in CHCl$_3$), $\lambda_{max.}$ 250 to 252 m$\mu$ ($\epsilon$=20,275) in ethanol, and its borane adduct.

EXAMPLE 50

*Preparation of 6-Dimethylaminomethyl-3-Methoxyoestra-3,5-Dien-17-One*

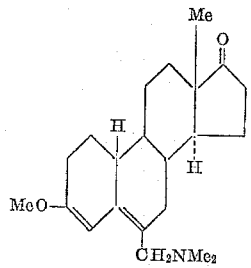

3-methoxyoestra-2,5(10)-dien-17-one (8 g.) in ethylenedichloride (25 ml.)+0.25 ml. pyridine was added to the reagent prepared at 0° C. from phosgene (3.6 g.) in ethylenedichloride (36 ml.) and dimethylformamide (5.4 ml.) in ethylenedichloride (20 ml.), The mixture was stirred at 0° C. for 2 hours, then phenazone (6.2 g.) was added, followed by lithium borohydride (432 mg.) in anhydrous tetrahydrofuran (16.8 ml.), added dropwise over 5 minutes. The mixture was then poured into water, and the product extracted into ether, which was washed four times with water, then extracted with succinic acid (8 g.) in water (80 ml.) used in two portions. The succinic acid solution was treated with potassium carbonate (10 g.) in water (50 ml.), and the product extracted with ether, which was washed, dried (Na$_2$SO$_4$) and evaporated, leaving a pale yellow gum. This crystallised on trituration with petroleum ether (B.P. 40 to 60° C.), and the product was purified from aqueous methanol to give 6-dimethylaminomethyl-3-methoxyestra-3,5-dien-17-one in prismatic needles, M.P. 115 to 116° C., $[\alpha]_D^{26}$—109° (c., 0.95 in dioxan), $\lambda_{max.}$ 250 m$\mu$ ($\epsilon$=20,335), $\gamma_{max.}$ (in CCl$_4$) 3089, 2745, 2710, 1743, 1650 and 1641 cm.$^{-1}$.

EXAMPLE 51

*Preparation of 21-Acetoxy-6-Dimethylaminomethyl-3-Methoxypregna-3,5,17(20)-Trien-11-One*

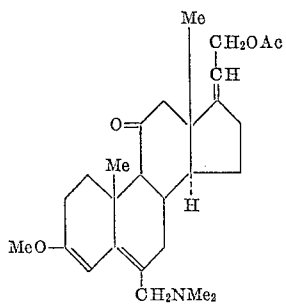

The process of Example 22, applied to 21-acetoxy-3-methoxypregna-3,5,17(20)-trien-11-one, gave 21-acetoxy-6-dimethylaminomethyl - 3 - methoxypregna-3,5,17(20)-trien-11-one.

EXAMPLE 52

*Preparation of 6-Dimethylaminomethylcortisone 17α,21-Acetonide 3-Enol Methyl Ether*

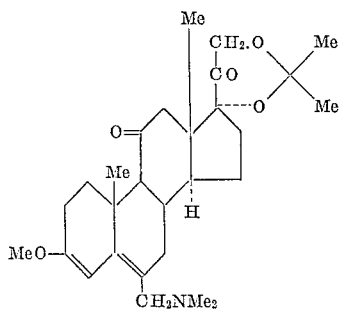

Cortisone 17α,21-acetonide 3-enol methyl ether (copending application S.N. 150,140, filed November 6, 1961), treated by the process of Example 22 gave 6-dimethylaminomethylcortisone 17α,21-acetonide 3-enol methyl ether, prisms from aqueous methanol, M.P. 141 to 143° C.

EXAMPLE 53

*Preparation of 6-Dimethylaminomethylhydrocortisone 21-Acetate 3-Enol Ethyl Ether*

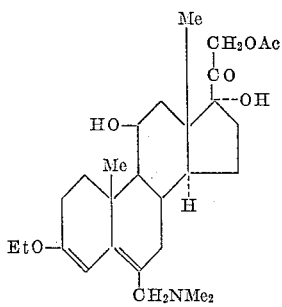

Hydrocortisone 21-acetate 3-enol ethyl ether (6 g.) in methylene chloride (50 ml.) and pyridine (0.3 ml.) was added to the complex prepared from dimethylformamide (10 ml.) and phosgene (4.3 g., 3 molar proportions) in methylene chloride (60 ml.) at 0° C. After stirring for 1 hour phenazone (8 g.) was added, followed by lithium borohydride (0.51 g., 1.6 molar proportions) in anhydrous tetrahydrofuran (18 ml.), added dropwise over 10 minutes with vigorous stirring. The mixture was then poured into water, and extracted with ether (250 ml.) which was washed with water four times. The basic product was separated from by-products by extraction with succinic acid (10 ml.) in water (160 ml.), used in six portions. The combined aqueous extracts were extracted once with ether, then made alkaline by the addition of strong ammonia solution. The product was isolated with ether, and purified from acetone/hexane to give 6-dimethylaminomethylhydrocortisone 21-acetate - 3 - enol ethyl ether in plates, M.P. 203 to 205° C., $[\alpha]_D^{20}$—24° (c. 0.97 in CHCl$_3$), $\lambda_{max.}$ 252 m$\mu$ ($\epsilon$=20,170) in ethanol.

Hydrocortisone 21-acetate 3-enol methyl ether treated as above gave 6-dimethylaminomethylhydrocortisone 21-acetate 3-enol methyl ether, $\lambda_{max.}$ 252 m$\mu$ ($\epsilon$=19,880) in ethanol.

EXAMPLE 54

*Preparation of 6-Piperidinomethyltestosterone Acetate 3-Enol Methyl Ether*

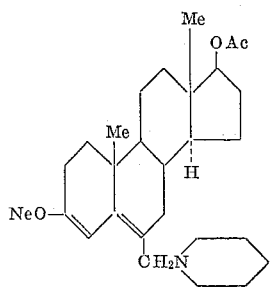

Testosterone acetate 3-enol methyl ether (5 g.), N-formylpiperidine (10 ml.), pyridine (0.5 ml.) and methylene chloride (30 ml.) were stirred at 0° C. and treated dropwise with phosgene (5 g.) in methylene chloride (60 ml.) over ½ hour. After a further ¾ hour at 0° C. the red solution was treated dropwise with 2% lithium borohydride in tetrahydrofuran until the red colour was discharged. The solution was then poured into dilute sodium carbonate solution, and the product extracted with ether. The washed and dried (Na$_2$SO$_4$) ether was evaporated, and the residual syrup was freed from excess of N-formyl piperidine by shaking with water (400 ml.) twice. The residual gum was purified from aqueous methanol followed by methanol to give 6 - piperidinomethyltestosterone acetate 3 - enol methyl ether in prisms, M.P. 125 to 127° C., $[\alpha]_D^{24}$ —138° (c. 0.98 in CHCl$_3$), $\lambda_{max.}$ 250 m$\mu$ ($\epsilon$=19,520) in ethanol.

EXAMPLE 55

*Preparation of 17β-Acetoxy-6-Dimethylaminomethyl-3-Methoxyandrosta-3,5-Diene*

A solution of dimethylformamide (15 ml.) in methylene chloride (25 ml.) at 0° C. was treated dropwise with phosphoryl chloride (7.5 g.) in methylene chloride (75 ml.), followed immediately by testosterone acetate 3-enol methyl ether (10 g.) in methylene chloride (100 ml.) and pyridine (0.5 ml.). The mixture was stirred at 0° C. for 20 minutes then treated dropwise with 3% lithium borohydride in tetrahydrofuran until the mixture was pale yellow, then poured into dilute sodium carbonate solution, and the products extracted with ether. The ether was extracted with 3 x 60 ml. of 5% aqueous succinic acid, then washed with water, dried (Na$_2$SO$_4$) and evaporated. The residue was purified from ethanol to give 17β - acetoxy - 3 - methoxy-6-dimethylaminomethyl-androsta-3,5-diene borane, M.P. 140 to 144° C., identical with the product prepared in Example 12.

The succinic acid extracts were poured into 5% aqueous sodium carbonate (200 ml.) and the product extracted with ether, which was washed, dried (Na$_2$SO$_4$) and evaporated. The residue was purified from aqueous methanol to give 17β-acetoxy-6-dimethylaminomethyl-3-methoxyandrosta-3,5-diene, M.P. 108 to 110° C., identical with the product prepared in Example 48.

EXAMPLE 56

*Preparation of 6-Dimethylaminomethyl-3-Methoxy-9β,10α-Pregna-3,5-Dien-20-One*

A solution of 3-methoxy-9β,10α-pregna-3,5-dien-20-one (copending application S.N. 150,140, filed November 6, 1961) (2 g.) in dry ethylenedichloride (15 ml.) was added at 0° C. to a stirred suspension of the complex prepared from dimethylformamide (2 ml.) and phosgene (0.9 g.) in dry ethylenedichloride (20 ml.) and the mixture was stirred at 0° C. for 1½ hours. Phenazone (1.75 g.) was added, followed by a solution of lithium borohydride (0.11 g.) in dry tetrahydrofuran (4 ml.) added dropwise. The mixture was then poured into water containing sodium carbonate (2 g.) and the product was extracted into ether. The ether extract was washed with water and then with three portions of aqueous succinic acid (10%). The combined succinic acid solutions were made alkaline with sodium carbonate solution and the precipitated product was extracted into ether. Evaporation of the water-washed and dried ether extract afforded a product containing 6-dimethylaminomethyl-3-methoxy-9β,10α-pregna-3,5-dien-20-one on the bases of $\lambda_{max.}^{EtOH}$ 250 mμ (ε 19,000) and $\gamma_{max.}^{Nujol}$ 1705, 1660 and 1625 cm.$^{-1}$

We claim:

1. A process for converting a 3-enol ether of a 3-oxo-Δ⁴-steroid, unsubstituted in positions 4 and 6, into a corresponding 6-(N-disubstituted) aminomethyl derivative, comprising: treating the said 3-enol ether with a Vilsmeier reagent providing an N-disubstituted amino group, under anhydrous conditions, and reducing the resulting 6-methinyl iminium salt under anhydrous conditions with a reagent providing hydride ions.

2. A process as claimed in claim 1 wherein the Vilsmeier reagent is a complex formed from dimethylformamide and a compound selected from the group consisting of phosphorus oxychloride and phosgene.

3. A process as claimed in claim 1 wherein the 3-enol ether is treated with the Vilsmeier reagent in a halogenated hydrocarbon solvent selected from the group consisting of ethylenedichloride and methylenedichloride at a temperature from 0° C. to 25° C. for a reaction period of up to 2 hours.

4. A process as claimed in claim 1 wherein the reduction is effected with a reducing agent selected from the group consisting of hydrides and organometallic hydrides of boron and aluminium.

5. A process as claimed in claim 1 wherein said 3-enol ether of a 3-oxo-Δ⁴ steroid, unsubstituted in positions 4 and 6, is a 3-(hydroxyalkyl)enol ether formed in situ in the presence of said Vilsmeier reagent from a corresponding 3-alkylenedioxy-Δ⁵ steroid.

6. A process as claimed in claim 1 wherein said 3-enol ether of a 3-oxo-Δ⁴ steroid, unsubstituted in positions 4 and 6, is selected from the group consisting of 3-enolic ethers of the 19-norandrostane and 19-norpregnane series and is formed in situ in the presence of said Vilsmeier reagent from the corresponding 3-ether of oestra-2,5 (10)-diene-3-ol.

7. A process as claimed in claim 1 wherein not less than 1.05 molar proportions of the Vilsmeier reagent are employed.

8. A process as claimed in claim 1 wherein the 3-enol ether to be converted is free of substituents that react with the Vilsmeier reagent and about 1.05 to 1.6 molar proportions of Vilsmeier reagent are employed.

9. 17α,20:20,21 - bismethylenedioxy - 6 - dimethyl - aminomethyl-3-ethoxypregna-3,5-dien-11-one.

10. 17α - acetoxy - 6 - dimethylaminomethyl - 3 - methoxy-16-methylenepregna-3,5-dien-20-one.

11. A compound selected from the group consisting of 17α-acetoxy-3-ethoxy-6-dimethylaminomethylpregna-3,5-dien-20-one and the borane adduct and citrate thereof.

12. A compound selected from the group consisting of 6-dimethylaminomethyl cortisone acetate 3-enol ethyl ether and its hydrochloride.

13. 3-ethoxy - 6 - dimethylaminomethylandrosta - 3,5 - dien-17-one.

14. 21 - acetoxy - 3 - n-propyloxy - 17α - hydroxy - 6 - dimethylaminomethylpregna-3,5-diene-11,20-dione.

15. 21 - acetoxy - 17α - hydroxy - 3 - methoxy - 6 - dimethylaminomethylpregna-3,5,9(11)-trien-20-one.

16. 17α,20:20,21 - bismethylenedioxy - 6 - dimethylaminomethyl-3-ethoxypregna-3,5-dien-11β-ol.

17. 6 - dimethylaminomethylcortisone acetate 3-enol methyl ether.

18. 6 - dimethylaminomethyl - 3 - methoxyandrosta-3,5-dien-17-one.

19. 6 - dimethylaminomethyl - 3 - methoxyoestra-3,5-dien-17-one.

20. 21 - acetoxy - 6 - dimethylaminomethyl - 3 - methoxypregna-3,5,17(20)-trien-11-one.

21. 6 - dimethylaminomethylcortisone 17α,21-acetonide 3-enol methyl ether.

22. 6 - dimethylaminomethylhydrocortisone 21-acetate 3-enol methyl ether.

23. A process for converting a 3-enol ether of a 3-oxo-Δ⁴-steroid, unsubstituted in positions 4 and 6, into a borane complex of the corresponding 6 (N-disubstituted) aminomethyl derivative, comprising: treating the said 3-enol ether with a Vilsmeier reagent providing an N-disubstituted amino group, under anhydrous conditions, and reducing the resulting 6-methinyl iminium salt under anhydrous conditions with an excess of a reagent selected from the group consisting of boron hydrides and metallic borohydrides.

24. A process for converting a 3-enol ether of a 3-oxo-Δ⁴-steroid into a corresponding 6-aminomethyl derivative having in rings A and B of the steroid nucleus the following structure:

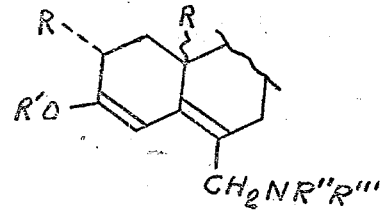

where R is selected from the group consisting of hydrogen and methyl, R' is selected from the group consisting of alkyl, hydroxyalkyl, cycloalkyl and aralkyl, and NR''R''' is selected from the group consisting of (a)

where R'' is an alkyl group containing up to 6 carbon atoms and R''' is selected from the group consisting of alkyl containing up to 6 carbon atoms and phenyl, and (b) NR''R''' where N,R'' and R''' form a ring selected from the group consisting of piperidino, pyrolidino, and morpholino, which process comprises treating said 3-enol ether, unsubstituted in positions 4 and 6, under anhydrous conditions with a Vilsmeier reagent formed by the reaction of an N-formyl derivative of a secondary amine having an NR''R''' group as defined above with an acid halide with nucleophilic displacement of a halide ion to give a corresponding iminium intermediate of said 3-enol ether having in rings A and B the structure:

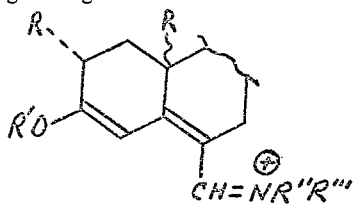

where R, R' and NR"R'" have the meaning defined above, and reducing said iminium intermediate to give the said 6-amino methyl 3-enol ether.

25. A process for converting a 3-enol ether of a 3-oxo-$\Delta^4$-steroid into a borane complex of the corresponding 6-aminomethyl derivative, said borane complex having in rings A and B of the steroid nucleous the following structure:

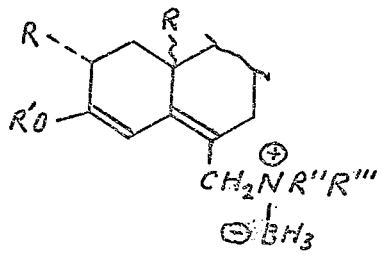

where R is selected from the group consisting of hydrogen and methyl, R' is selected from the group consisting of alkyl, hydroxyalkyl, cycloalkyl and aralkyl, and NR"R'" is selected from the group consisting of (a)

where R" is an alkyl group containing up to 6 carbon atoms and R'" is selected from the group consisting of alkyl containing up to 6 carbon atoms and phenyl, and (b) NR"R'" where N,R" and R'" form a ring selected from the group consisting of piperidino, pyrolidino, and morpholino, which process comprises treating said 3-enol ether, unsubstituted in positions 4 and 6, under anhydrous conditions with a Vilsmeier reagent formed by the reaction of an N-formyl derivative of a secondary amine having an NR"R'" group as defined above with an acid halide with nucleophilic displacement of a halide ion to give a corresponding iminium intermediate of said 3-enol ether having in rings A and B the structure:

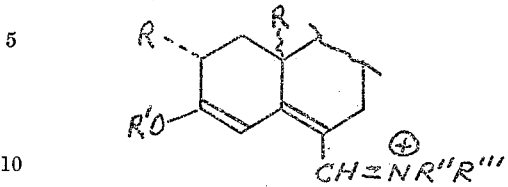

where R, R', and NR"R'" have the meaning defined above, and reducing said iminium intermediate with an excess of a reagent selected from the group consisting of boron hydrides and metallic borohydrides.

26. A compound selected from the group consisting of: 3-enol ethers of 3-oxo-$\Delta^4$-6-aminomethyl steroids of the androstane, 19-norandrostane, pregnane and 19-nor-pregnane series, said 3-enol ethers having in rings A and B of the steroid nucleus the following structure:

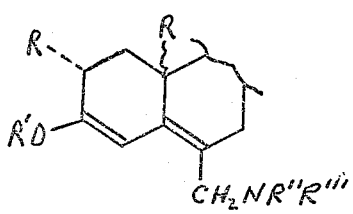

where R is selected from the group consisting of hydrogen and methyl, R' is selected from the group consisting of alkyl, hydroxyalkyl, cycloalkyl and aralkyl, and NR"R'" is selected from the group consisting of (a)

$$\text{N}\diagup_{R'''}^{R''}$$

where R" is an alkyl group containing up to 6 carbon atoms and R'" is selected from the group consisting of alkyl containing up to 6 carbon atoms and phenyl, and (b) NR"R'" where N,R" and R'" form a ring selected from the group consisting of piperidino, pyrolidino, and morpholino; the addition compounds of said 3-enol ethers with an acid, and; the addition compounds of said 3-enol ethers with a borane.

No references cited.